US011765614B2

(12) United States Patent
Ryu et al.

(10) Patent No.: US 11,765,614 B2
(45) Date of Patent: Sep. 19, 2023

(54) BEAMFORMED CHANNEL OCCUPANCY RATIO

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Juan Montojo, San Diego, CA (US); Peter Gaal, San Diego, CA (US); Jelena Damnjanovic, Del Mar, CA (US); Jing Sun, San Diego, CA (US); Xiaoxia Zhang, San Diego, CA (US); Hua Wang, Basking Ridge, NJ (US); Xiaojie Wang, Hillsborough, NJ (US); Piyush Gupta, Bridgewater, NJ (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/167,629

(22) Filed: Feb. 4, 2021

(65) Prior Publication Data

US 2022/0248251 A1    Aug. 4, 2022

(51) Int. Cl.
*H04W 28/02* (2009.01)
*H04B 7/0408* (2017.01)
*H04W 24/08* (2009.01)

(52) U.S. Cl.
CPC ...... *H04W 28/0205* (2013.01); *H04B 7/0408* (2013.01); *H04W 24/08* (2013.01)

(58) Field of Classification Search
CPC . H04W 28/0205; H04W 24/08; H04B 7/0408
See application file for complete search history.

(56) References Cited

U.S. PATENT DOCUMENTS

| | | | | |
|---|---|---|---|---|
| 2016/0007223 A1* | 1/2016 | Sun | ....................... | H04L 47/125 709/219 |
| 2018/0234973 A1* | 8/2018 | Lee | ....................... | H04W 24/08 |
| 2019/0274065 A1* | 9/2019 | Zhao | ..................... | H04W 24/10 |
| 2019/0313279 A1* | 10/2019 | Li | ....................... | H04W 28/0284 |
| 2020/0015298 A1* | 1/2020 | Chae | ..................... | H04W 72/02 |

(Continued)

FOREIGN PATENT DOCUMENTS

WO    2020033477 A1    2/2020

OTHER PUBLICATIONS

ETSI TR 137 985 V16.0.0 (Year: 2020).*
International Search Report and Written Opinion—PCT/US2022/070292—ISA/EPO—dated Apr. 13, 2022.

*Primary Examiner* — Hassan Kizou
*Assistant Examiner* — Hector Reyes
(74) *Attorney, Agent, or Firm* — QUALCOMM Incorporated

(57) ABSTRACT

Various aspects of the present disclosure generally relate to wireless communication. In some aspects, a user equipment (UE) may measure, using one or more beams included in a first beam group associated with the UE, a channel occupancy ratio (CR) for the first beam group. The UE may perform an action if the CR for the first beam group does not satisfy a CR limit associated with the first beam group. Numerous other aspects are described.

30 Claims, 14 Drawing Sheets

(56) References Cited

U.S. PATENT DOCUMENTS

| | | | |
|---|---|---|---|
| 2020/0052803 A1* | 2/2020 | Deenoo | H04B 17/318 |
| 2020/0145867 A1* | 5/2020 | Tseng | H04L 1/0026 |
| 2020/0221423 A1* | 7/2020 | Wang | H04W 72/0453 |
| 2020/0314916 A1* | 10/2020 | Park | H04W 4/40 |
| 2020/0351705 A1 | 11/2020 | Chae et al. | |
| 2021/0022139 A1* | 1/2021 | Shin | H04W 72/0406 |
| 2021/0051510 A1* | 2/2021 | Chae | H04B 17/309 |
| 2022/0046445 A1* | 2/2022 | Morejon Garcia | H04B 17/318 |

* cited by examiner

BEAMFORMED CHANNEL OCCUPANCY RATIO

FIELD OF THE DISCLOSURE

Aspects of the present disclosure generally relate to wireless communication and to techniques and apparatuses for a beamformed channel occupancy ratio (CR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: measure, using one or more beams included in a first beam group associated with the UE, a channel occupancy ratio (CR) for the first beam group; and perform an action if the CR for the first beam group does not satisfy a CR limit associated with the first beam group.

In some aspects, a method of wireless communication performed by a UE includes measuring, using one or more beams included in a first beam group associated with the UE, a CR for the first beam group; and performing an action if the CR for the first beam group does not satisfy a CR limit associated with the first beam group.

In some aspects, a non-transitory computer-readable medium storing a set of instructions for wireless communication includes one or more instructions that, when executed by one or more processors of a UE, cause the UE to: measure, using one or more beams included in a first beam group associated with the UE, a CR for the first beam group; and perform an action if the CR for the first beam group does not satisfy a CR limit associated with the first beam group.

In some aspects, an apparatus for wireless communication includes means for measuring, using one or more beams included in a first beam group associated with the apparatus, a CR for the first beam group; and means for performing an action if the CR for the first beam group does not satisfy a CR limit associated with the first beam group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
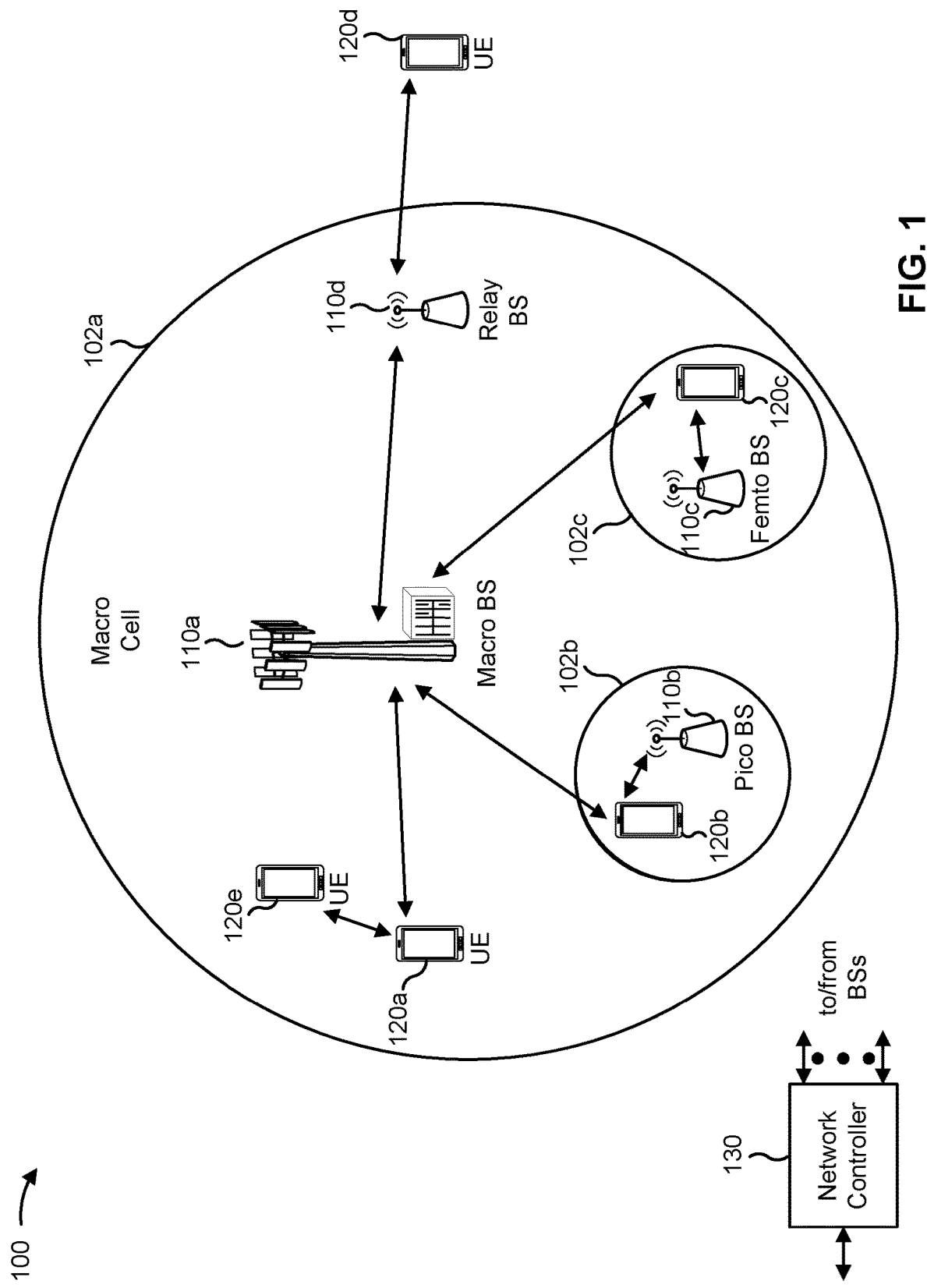
FIG. 1 is a diagram illustrating an example of a wireless network.

FIG. 1 is a diagram illustrating an example of a wireless network 100. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
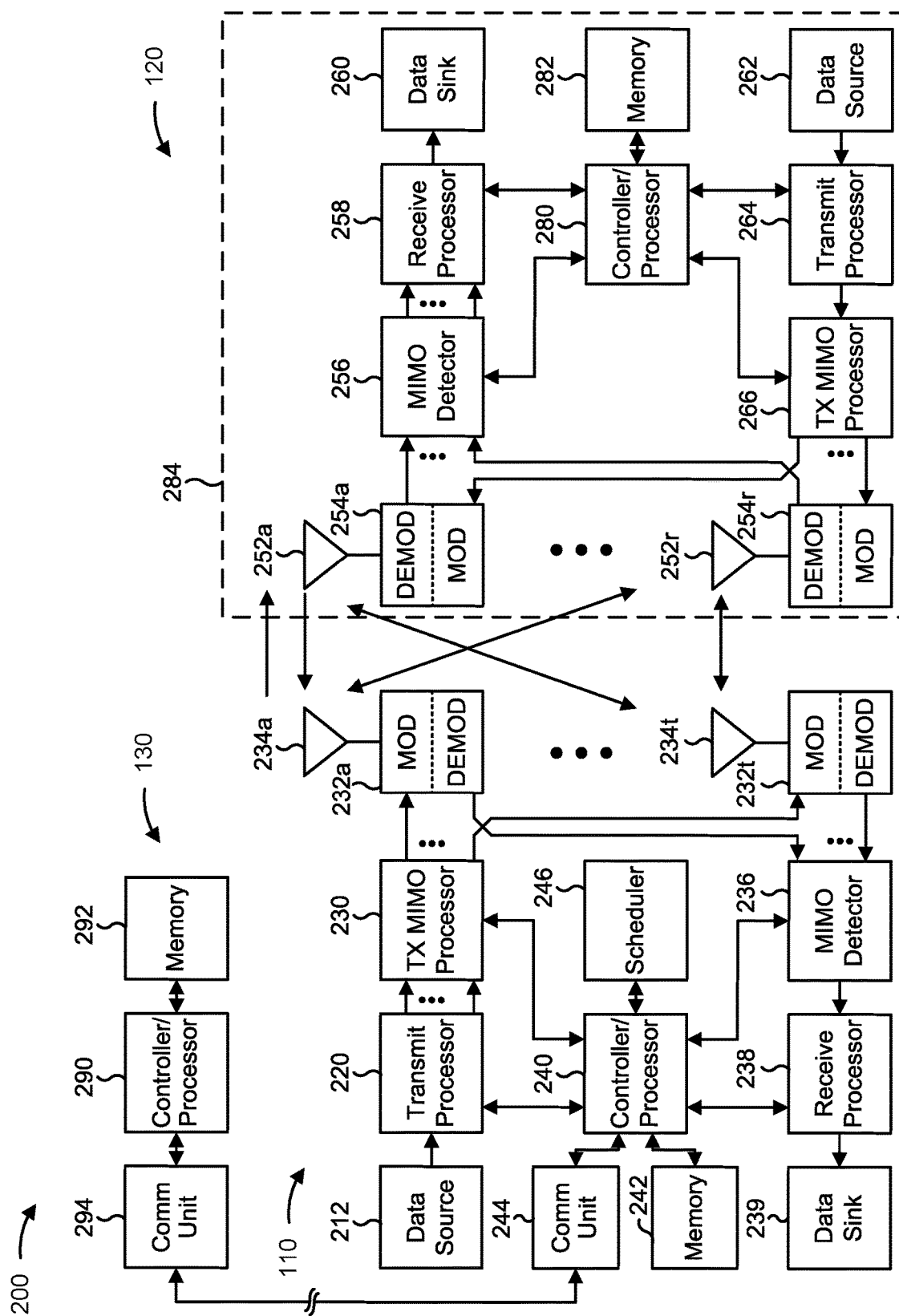
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8, 9, 10, 11, 12, and/or 13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8, 9, 10, 11, 12, and/or 13.

Controller/processor 240 of base station 110, controller/processor 280 of UE 120, and/or any other component(s) of FIG. 2 may perform one or more techniques associated with a beamformed channel occupancy ratio (CR), as described in more detail elsewhere herein. For example, controller/processor 240 of base station 110, controller/processor 280 of UE 120, and/or any other component(s) of FIG. 2 may perform or direct operations of, for example, process 1300 of FIG. 13 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13 and/or other processes as described herein. In some aspects, executing instructions may include running the instructions, converting the instructions, compiling the instructions, and/or interpreting the instructions, among other examples.

In some aspects, the UE 120 includes means for measuring, using one or more beams included in a first beam group associated with the UE, a CR for the first beam group; and/or means for performing an action if the CR for the first beam group does not satisfy a CR limit associated with the first beam group. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining the CR limit associated with the first beam group based at least in part on at least one of: a first channel busy ratio (CBR) for the first beam group, a second CBR associated with another UE that is communicating with the UE, or a second CR limit associated with the other UE.

In some aspects, the UE 120 includes means for measuring, using one or more beams included in the first beam group, a CBR for the first beam group; and/or means for determining the CR limit associated with the first beam group based at least in part on the CBR for the first beam group.

In some aspects, the UE 120 includes means for measuring the CR based at least in part on a number of subchannels used for transmitting signals using beams included in the first beam group; and/or means for measuring the CR based at least in part on a number of subchannels used for receiving signals using beams included in the first beam group.

In some aspects, the UE 120 includes means for reducing a transmission rate of transmissions using beams included in the first beam group.

In some aspects, the UE 120 includes means for transmitting, to a transmitter device (e.g., another UE), a request to reduce a transmission rate of transmissions that are to be received by the UE using beams included in the first beam group.

In some aspects, the UE 120 includes means for receiving, from a receiver device (e.g., another UE), a request to reduce a transmission rate of transmissions to the receiver device; and/or means for reducing the transmission rate of transmissions to the receiver device for transmissions by the UE 120 that use one or more beams included in the first beam group based at least in part on receiving the request.

In some aspects, the UE 120 includes means for increasing a transmission rate of transmissions to a second receiver device for transmissions by the UE 120 that use one or more beams included in the first beam group based at least in part on reducing the transmission rate of transmissions to the receiver device.

In some aspects, the UE 120 includes means for receiving, from a first transmitter device, a first signal using a beam included in the first beam group; means for receiving, from a second transmitter device, a second signal using the beam or another beam included in the first beam group; means for measuring the CR based at least in part on the first signal and the second signal; and/or means for transmitting a request to reduce a transmission rate of transmissions that are to be received by the UE using beams included in the first beam group to at least one of the first transmitter device or the second transmitter device.

In some aspects, the UE 120 includes means for receiving, from a receiver device, an indication of a second CR limit associated with the receiver device; means for measuring a second CR for the receiver device based at least in part on transmissions to the receiver device that use a beam included in the first beam group; and/or means for determining a transmission rate for transmissions to the receiver device based at least in part on the second CR and the second CR limit.

In some aspects, the UE 120 includes means for transmitting, to a transmitter device, an indication of the CR limit for the first beam group; and/or means for receiving, from the transmitter device, one or more signals at a transmission rate that is based at least in part on the CR limit.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
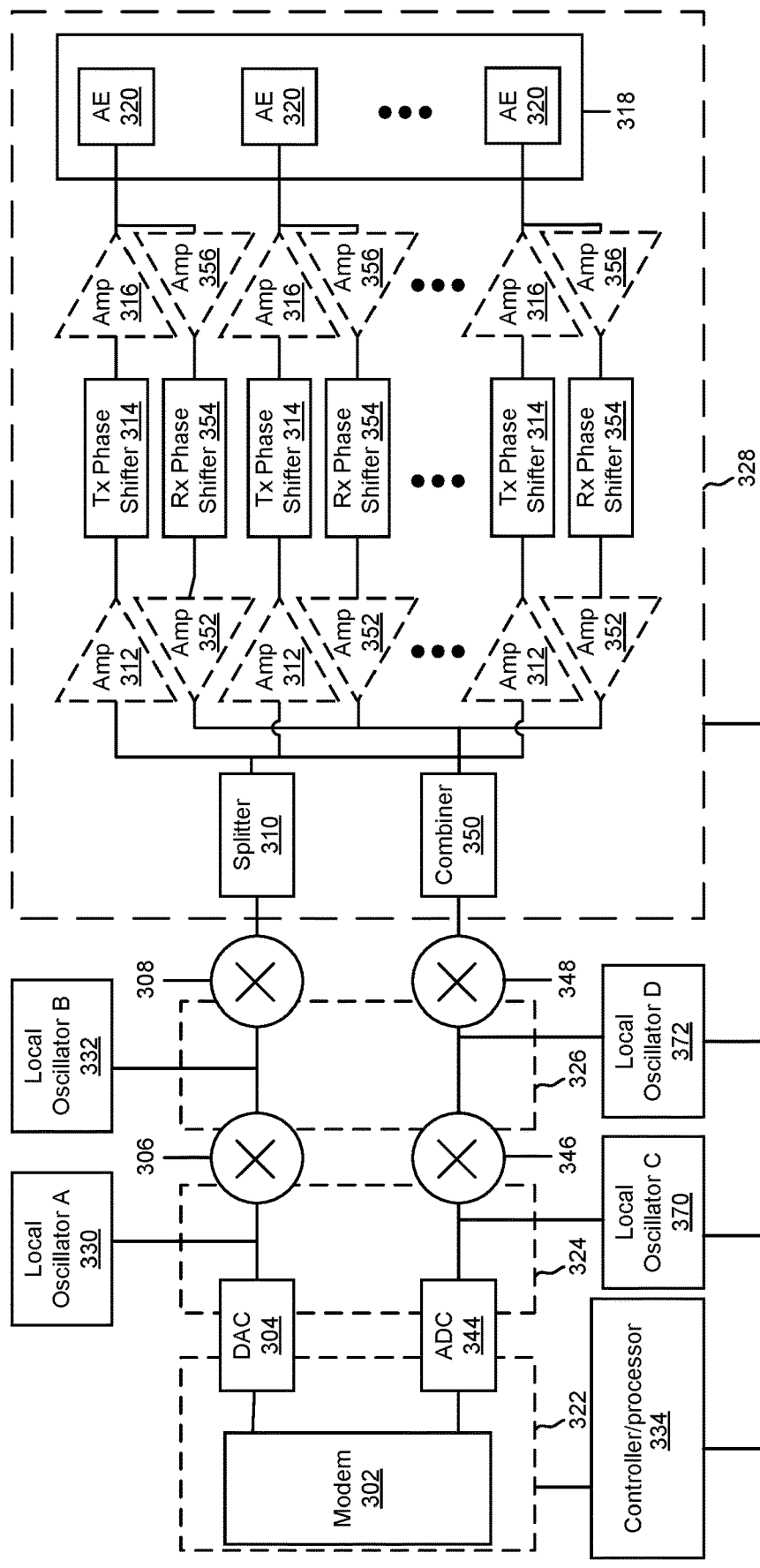
FIG. 3 is a diagram illustrating an example beamforming architecture that supports beamforming for communications.

FIG. 3 is a diagram illustrating an example beamforming architecture 300 that supports beamforming for communications. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
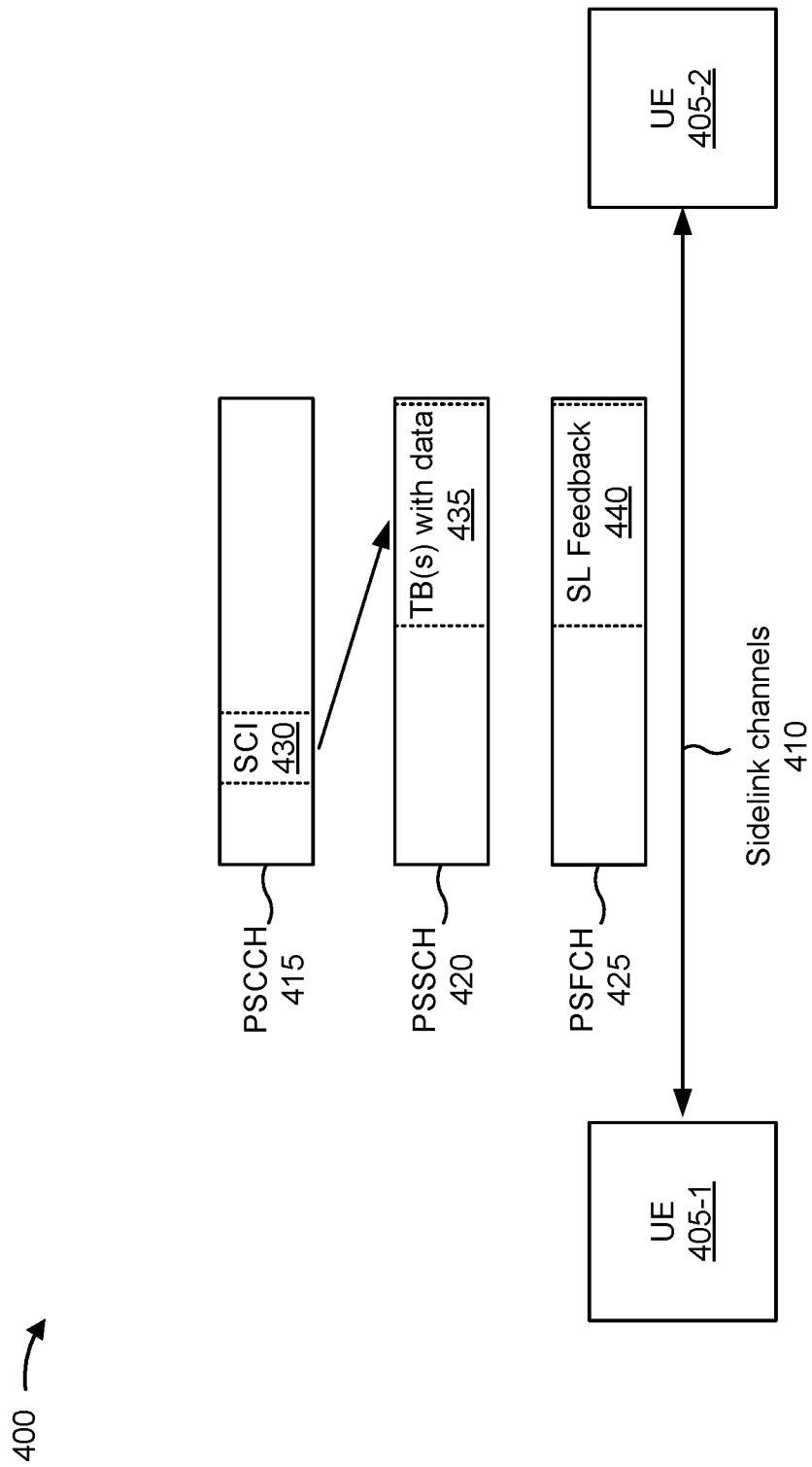
FIG. 4 is a diagram illustrating an example of sidelink communications.

FIG. 4 is a diagram illustrating an example 400 of sidelink communications. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, vehicle-to-pedestrian (V2P) communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel The PSSCH 420 may be used to communicate data, similar to a physical downlink shared channel (PDSCH) and/or a physical uplink shared channel (PUSCH) used for cellular communications with a base station 110 via an access link or an access channel For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a CBR associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
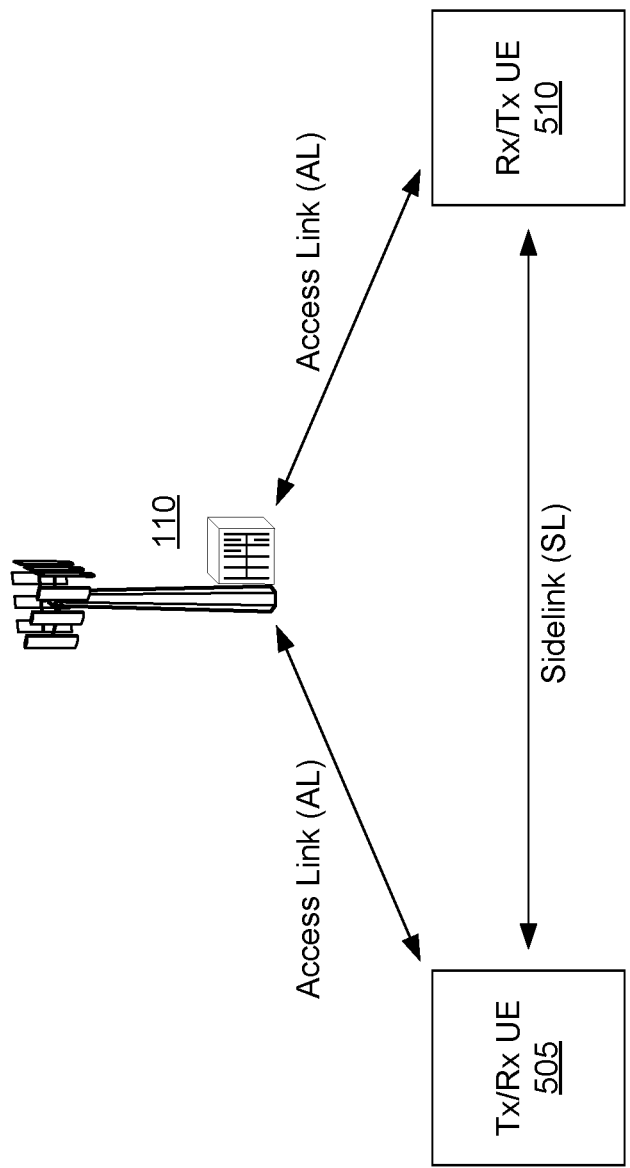
FIG. 5 is a diagram illustrating an example of sidelink communications and access link communications.

FIG. 5 is a diagram illustrating an example 500 of sidelink communications and access link communications. As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
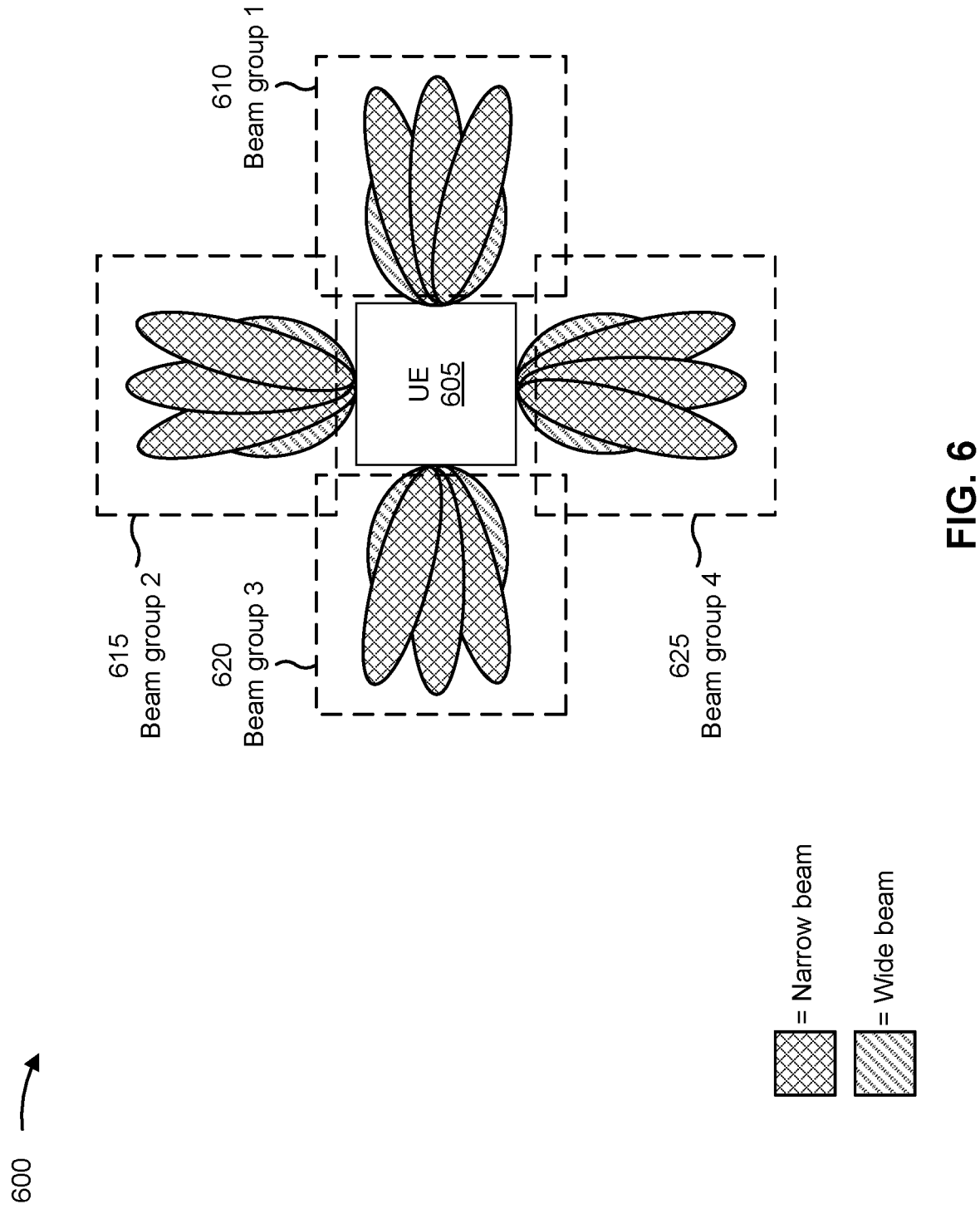
FIG. 6 is a diagram illustrating an example of beam groups.

FIG. 6 is a diagram illustrating an example 600 of beam groups. As shown in FIG. 6, a UE 605 may communicate (e.g., transmit and/or receive) using different beams that are associated with different spatial directions. The beams may be associated with different shapes (such as the amplitudes, widths, and/or presence of side lobes) and directions (such as an angle of the beam relative to a surface of an antenna array), as described above in connection with FIG. 3. For example, as shown in FIG. 6, the UE 605 may be capable of forming wide beams ( ) and/or narrow beams. The wide beams may be associated with a relatively large width. In some aspects, a wide beam may be a beam that has not been refined and/or a beam that is associated with a low beamforming gain, among other examples. A narrow beam may be associated with a relatively narrow width. For example, a narrow beam may be a beam that has been refined and/or a beam that is associated with a high beamforming gain, among other examples. Although the narrow beams shown in FIG. 6 have similar widths, there may be various levels of narrow beams having different widths (e.g., different levels of beam refinement).

As shown in FIG. 6, the UE 605 may be capable of forming beams in different spatial directions. The UE 605 may group or associate beams that have a similar spatial direction (e.g., a similar angle relative to a surface of an antenna array) into a beam group. A beam group may include one or more beams. In some aspects, a beam group may include one or more wide beams and/or one or more narrow beams. For example, as shown by reference number 610, a first beam group (e.g., beam group 1) of the UE 605 may include 3 narrow beams and 1 wide beam that each have a similar spatial direction (e.g., to the east of UE 605). As shown by reference number 615, a second beam group (e.g., beam group 2) of the UE 605 may include 3 narrow beams and 1 wide beam that each have a similar spatial direction (e.g., to the north of UE 605). As shown by reference number 620, a third beam group (e.g., beam group 3) of the UE 605 may include 3 narrow beams and 1 wide beam that each have a similar spatial direction (e.g., to the west of UE 605). As shown by reference number 625, a fourth beam group (e.g., beam group 4) of the UE 605 may include 3 narrow beams and 1 wide beam that each have a similar spatial direction (e.g., to the south of UE 605). The beam groups shown in FIG. 6 are provided as examples. As described above, a beam group may include one beam or multiple beams, only narrow beam(s), only wide beam(s), and/or both wide and narrow beams, among other examples.

As indicated above, FIG. 6 is provided as an example. Other examples may differ from what is described with respect to FIG. 6.

Figure 7:
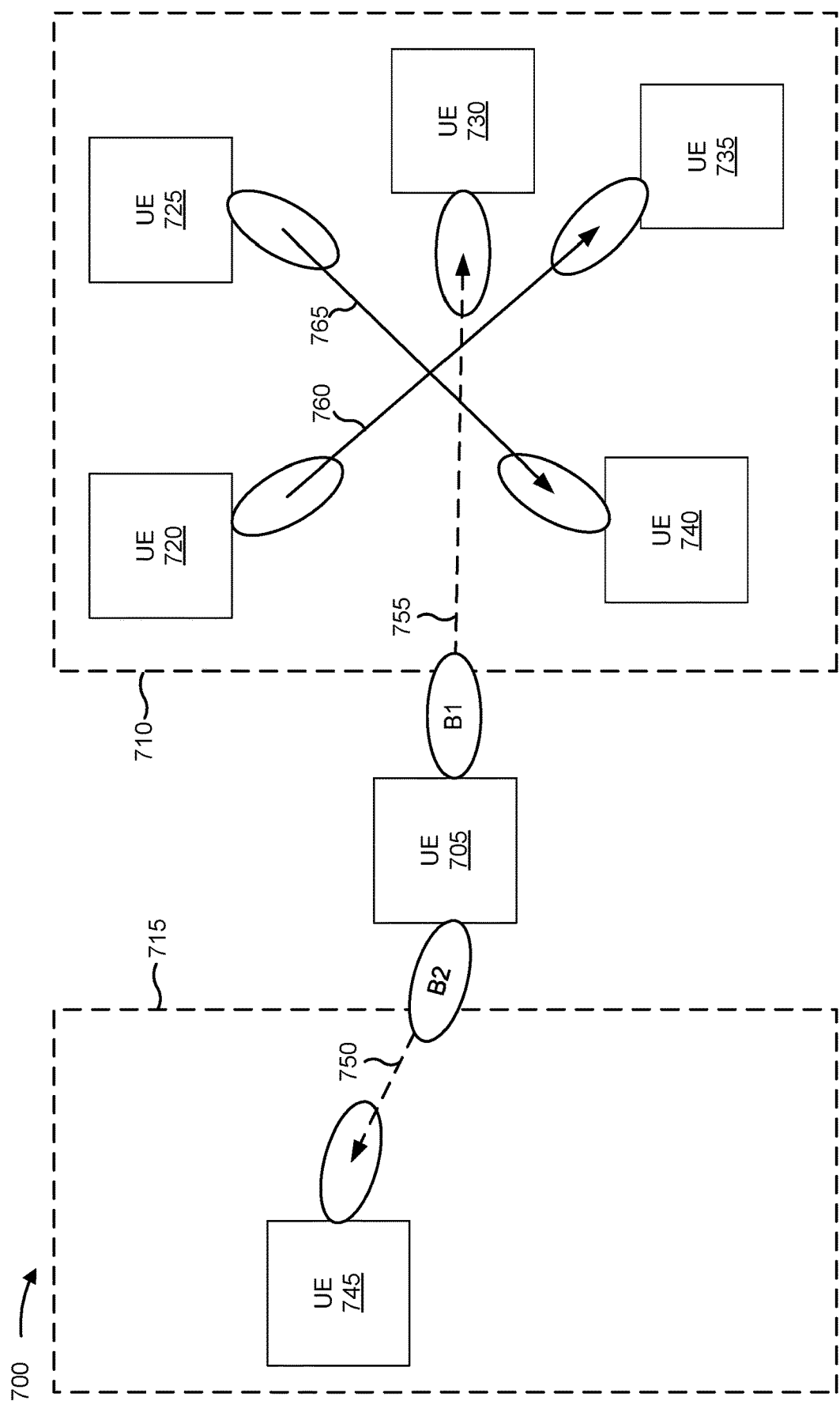
FIG. 7 is a diagram illustrating an example of a sidelink communication network.

FIG. 7 is a diagram illustrating an example 700 of a sidelink communication network. As shown in FIG. 7, the sidelink communication network may include a UE 705. The UE 705 may be a transmit (Tx) UE. As used herein, "transmit UE" or "Tx UE" may refer to a UE that is to transmit a sidelink communication in connection with the example being described. Similarly, as used herein, "receive UE" or "Rx UE" may refer to a UE that is to receive a sidelink communication in connection with the example being described. For example, in other scenarios, a "Tx UE" may receive communications in a similar manner as an Rx UE as described herein. Similarly, an "Rx UE" may transmit communications in a similar manner as a Tx UE as described herein. In some aspects, a Tx UE may be referred to herein as a transmitter device. In some aspects, an Rx UE may be referred to herein as a receiver device.

As shown in FIG. 7, the sidelink communication network may include a first portion shown by reference number 710 and a second portion shown by reference number 715. The first portion may include a UE 720, a UE 725, a UE 730, a UE 735, and a UE 740. The second portion may include a UE 745. The UE 705 may be capable of transmitting a sidelink communication using a first beam (e.g., B1) to the UE 730 in the first portion of the sidelink communication network, as shown by reference number 755. Additionally, or alternatively, the UE 705 may be capable of transmitting a sidelink communication using a second beam (e.g., B2) to the UE 745 in the second portion of the sidelink communication network, as shown by reference number 750.

Generally, if a channel to be used for a sidelink communication is busy, then the sidelink communication may cause interference with or may collide with another transmission on the channel Thus, when a Tx UE (e.g., UE 705) needs to transmit a sidelink communication to an Rx UE (e.g., UE 730 and/or UE 745), the Tx UE should take into consideration how busy the channel is when determining when/ whether to transmit the sidelink communication on the sidelink channel In order to achieve this, the Tx UE may be configured to monitor a CBR associated with the sidelink channel A CBR is a measurement indicative of how busy a channel is and, therefore, may indicate a probability of interference or a collision with another transmission on the channel For example, a CBR may be approximately equal to a number of resources that a UE detects being used on the channel, divided by a total number of available resources on the channel A relatively high CBR may indicate that the channel is being frequently used for transmissions, meaning that a probability of interference or collision is relatively high. A relatively low CBR may indicate that the channel is not being used frequently, meaning that a probability of interference or collision is relatively low.

The CBR may be defined, or otherwise fixed, by a wireless communication standard, such as a 3GPP Specification. However, in prior wireless communication systems in which CBR-based techniques have been implemented, such as a Long Term Evolution (LTE) V2X system, a CBR is defined but does not address the concept of beamforming. Thus, in a system that uses beamforming (e.g., an NR system that uses millimeter wave (mmW) communications), the conventional approach to using CBR may be insufficient for assessing channel use.

Additionally, the UE 705 may use a CBR to determine a CR limit for the UE 705. A CR is a measurement that indicates a channel use by the UE 705. For example, a CR may be approximately equal to a number of resources (e.g., subchannels) being used by the UE 705, divided by a total number of resources (e.g., subchannels) available to the UE 705 during a measurement window. CR may be defined, or otherwise fixed, by a wireless communication standard, such as a 3GPP Specification. The CR limit may indicate an allowable ratio of a number of subchannels used by the UE 705 to a total number of sub-channels available to the UE 705. The CR limit may be based at least in part on a CBR. For example, as the CBR indicates how busy the channel is, the CR limit may be set to a lower value if the CBR indicates the channel is busy or may be set to a higher value if the CBR indicates the channel is idle. The UE 705 may monitor, determine, and/or modify a channel use (e.g., a transmission rate by the UE 705) to ensure that the measured CR of the UE 705 satisfies the CR limit.

However, similar to the CBR described above, in prior wireless communications systems in which CR-based techniques have been implemented, such as an LTE V2X system, a CR and CR limit are defined but those definitions do not address the concept of beamforming. Thus, in a system that uses beamforming (e.g., an NR system that uses millimeter wave (mmW) communications), the conventional approach to using CR and CR limit may be insufficient for monitoring and determining channel use by the UE 705.

For example, as described above, the UE 705 may be capable of transmitting into the first portion of the sidelink communication network or the second portion of the wireless communication network. As shown in FIG. 7, the first portion of the sidelink communication network may be congested and include multiple UEs transmitting on a channel For example, as shown by reference number 760, the UE 720 may be transmitting a sidelink communication to the UE 735. Similarly, as shown by reference number 765, the UE 725 may transmit a sidelink communication to the UE 740. Therefore, the first portion of the sidelink communication network may be relatively busy and may have a relatively high probability of interference or collision. Conversely, the second portion of the sidelink communication network may only include the UE 745 and may not have any other UEs transmitting on the sidelink channel Therefore, the second portion of the sidelink communication network may have a relatively low probability of interference or collision.

However, as described above, the UE 705 may be unable to determine different CBRs for the first beam (e.g., B1 transmitting into the first portion of the sidelink communication network), and for the second beam (e.g., B2 transmitting into the second portion of the sidelink communication network) to differentiate between the busy portion of the sidelink communication network (e.g., the first portion of the sidelink communication network) and the idle portion of the sidelink communication network (e.g., the second portion of the sidelink communication network). As a result, the UE 705 may be unable to use different CR limits when transmitting using the first beam (e.g., B1 transmitting into the first portion of the sidelink communication network) and the second beam (e.g., B2 transmitting into the second portion of the sidelink communication network). Moreover, the UE 705 may be unable to measure separate CRs for the first beam and the second beam. As a result, a communication performance of the UE 705 may be degraded, as the UE 705 may be unable to set different CR limits and/or measure different CRs for different beams and/or different beam groups.

Some techniques and apparatuses described herein enable a beamformed CR. For example, a UE may determine a CR limit for a beam group of the UE based at least in part on a measured CBR of the beam group (e.g., a beamformed CBR). The UE may measure a CR using one or more beams included in the beam group. For example, the UE may measure the CR for all signals transmitted (e.g., for a Tx UE) or received (e.g., for an Rx UE) using the beam group (e.g., using beams included in the beam group). The UE may compare the CR to the CR limit of the beam group. If the CR does not satisfy the CR limit (e.g., exceeds or is within a threshold amount of the CR limit), then the UE may perform an action to ensure that the CR limit of the beam group is satisfied. For example, if the UE is a Tx UE, then the UE may modify (e.g., reduce) a transmission rate (e.g., a number of subchannels being used by the UE over an amount of time) for signals being transmitted using the beam group. If the UE is an Rx UE, then the UE may transmit, to one or more Tx UEs transmitting signals to the Rx UE, a request to reduce the transmission rate for signals being transmitted to the UE (e.g., that are being received using the beam group).

In some aspects, the UE may determine a CR limit and/or measure a CR on a per-beam-group basis (e.g., rather than a per-beam basis) to ensure that the channel use by the UE in a spatial direction satisfies a CR limit. For example, as described above in connection with FIG. 6, the UE may be capable of forming beams having similar spatial directions. If the UE were to determine a CR limit and/or measure CR on a per-beam basis, then the UE may transmit on a first beam until a CR limit is met and transmit on a second beam until the CR limit is met. However, as the first beam and the second beam may have similar spatial directions (e.g., may be in the same beam group), signals transmitted using the first beam and the second beam may be transmitted to similar portions of a wireless network. Therefore, if the UE is enabled to reach a CR limit on both the first beam and the second beam, then the UE may exceed a desired CR limit for the spatial direction of the first beam and the second beam. By determining the CR limit and/or measuring the CR on a per-beam-group basis (e.g., for each beam group), the UE ensures that a desired CR limit for the spatial direction of the beam group is not exceeded. For example, if the UE were to transmit on the first beam and the second beam, the transmissions would both count towards the CR of the beam group that includes the first beam and the second beam (e.g., rather than counting separately on a per-beam basis). In this way, a CR limit for a spatial direction (e.g., for a beam group) can be set to ensure that the UE does not exceed a channel use (e.g., a CR limit) for the spatial direction of the beam group.

As a result, the UE may be enabled to use a beamformed CR and CR limit to monitor and modify transmission rates in a spatial direction (e.g., for a beam group). This enables a Tx UE to set a higher transmission rate (e.g., thereby improving communication performance) when the Tx UE is transmitting into an idle portion of the network (e.g., the second portion shown by reference number 715). Additionally, the Tx UE may be enabled to set a lower transmission rate (e.g., thereby reducing a likelihood of the transmissions causing interference and/or collisions) when the Tx UE is transmitting into a busy portion of the network (e.g., the first portion shown by reference number 710).

As indicated above, FIG. 7 is provided as an example. Other examples may differ from what is described with respect to FIG. 7.

Figure 8:
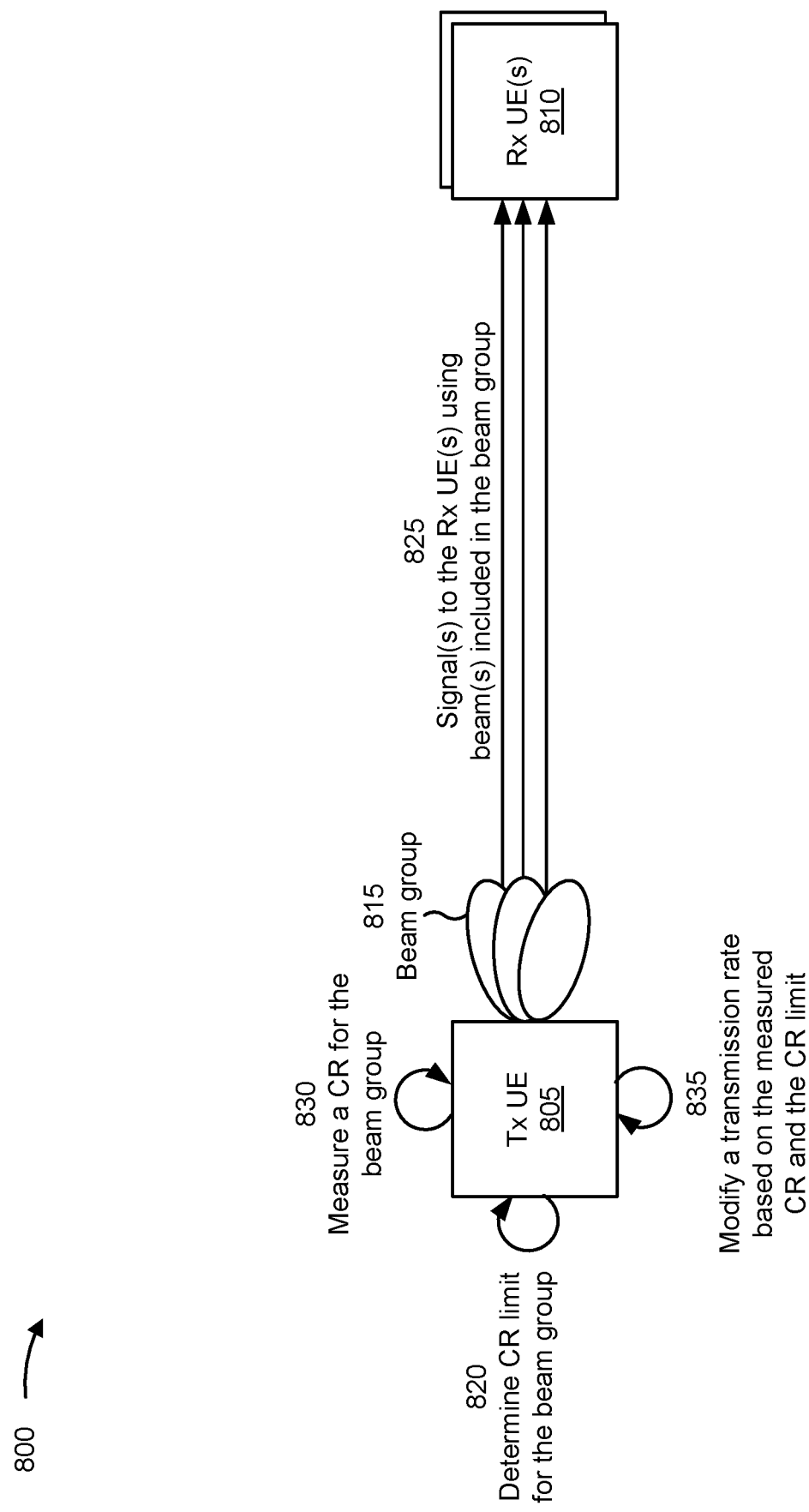
FIGS. 8-12 are diagrams illustrating examples associated with a beamformed channel occupancy ratio (CR), in accordance with various aspects of the present disclosure.

FIG. 8 is a diagram illustrating an example 800 associated with a beamformed CR, in accordance with various aspects of the present disclosure. As shown in FIG. 8, example 800 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5. As shown in FIG. 8, a Tx UE 805 may communicate with one or more Rx UEs 810.

As shown by reference number 815, the Tx UE 805 may use a beam group to transmit one or more signals to the one or more Rx UEs 810. The beam group may include one or more beams that have a similar spatial direction (e.g., as described above in connection with FIG. 6).

As shown by reference number 820, the Tx UE 805 may determine a CR limit of the beam group. The Tx UE 805 may determine the CR limit based at least in part on a CBR of the beam group (e.g., a Tx beamformed CBR), a CBR of an Rx UE 810, and/or a CR limit of an Rx UE 810, among other examples. For example, the Tx UE 805 may measure a CBR of the beam group using one or more beams included in the beam group. The Tx UE 805 may identify a number of resources (e.g., a number of subchannels) used or reserved by nearby Rx UEs 810 based at least in part on feedback communications (e.g., ACK/NACK feedback) and/or announcement messages transmitted by the Rx UEs 810 (e.g., that are received by the Tx UE 805 using beams included in the beam group).

For example, the Tx UE 805 may monitor for feedback communications and/or the announcement messages using the beams included in the first beam group. The Tx UE 805 may determine the number of resources (e.g., the number of subchannels) in which there were sidelink communications (e.g., PSSCH transmissions), as computed by the Tx UE 805 based at least in part on feedback communications and/or announcement messages received by the Tx UE 805 on beams included in the first beam group over a measurement window. The Tx UE 805 may determine the CBR of the beam group based at least in part on the number of resources (e.g., the number of subchannels) identified during the measurement window.

As a result, the Tx UE 805 is enabled to determine a channel use for nearby Rx UEs 810. For example, if the Tx UE 805 determines a relatively high CBR of the beam group, then the CBR may indicate a busy channel (e.g., a high number of UEs near the Tx UE 805 (in the spatial direction of the first beam) receiving communications). If the Tx UE 805 determines a relatively low CBR for the CBR of the beam group, then the first CBR may indicate an idle channel (e.g., a low number of UEs near the Tx UE 805 (in the spatial direction of the first beam) receiving communications). Therefore, the Tx UE 805 may determine the CR limit of the beam group based at least in part on the CBR of the beam group.

In some aspects, an Rx UE 810 may transmit, to the Tx UE 805, an indication of a CBR for a beam group of the Rx UE 810. Additionally, or alternatively, an Rx UE 810 may transmit, to the Tx UE 805, an indication of a CR limit for a beam group of the Rx UE 810. The Tx UE 805 may determine the CR limit of the beam group based at least in part on the CBR of the beam group, the CBR of the beam group of the Rx UE 810, and/or the CR limit of the beam group of the Rx UE 810, among other examples.

As shown by reference number 825, the Tx UE 805 may transmit, to the one or more Rx UEs 810, one or more signals using beams included in the beam group. A signal may be any transmission, such as a sidelink communication, a PSCCH communication, and/or a PSSCH communication. In some aspects, the one or more signals may be transmitted to the same Rx UE 810. In some aspects, the Tx UE 805 may transmit signal(s) to multiple Rx UEs 810 using beams included in the beam group.

As shown by reference number 830, the Tx UE 805 may measure a CR of the beam group. The CR may be based at least in part on the one or more signals transmitted using the beams included in the beam group. For example, the Tx UE 805 may monitor signals transmitted using any beams included in the beam group. The Tx UE 805 may determine and/or measure a number of resources (e.g., a number of subchannels) used by the Tx UE 805 for transmitting signals using beams included in the beam group. The Tx UE 805 may determine the CR of the beam group based at least in part on the number of resources (e.g., the number of subchannels) used for the transmissions over a measurement window, divided by a total number of available (e.g., configured) subchannels in a transmission pool during the measurement window.

As shown by reference number 835, the Tx UE 805 may modify a transmission rate (e.g., a number of subchannels being used over an amount of time) for transmissions that use beams included in the beam group based at least in part on the CR of the beam group. In some aspects, the Tx UE 805 may modify a number of subchannels being used by the Tx UE 805 for transmissions that use beams included in the beam group.

For example, the Tx UE 805 may compare the CR of the beam group to the CR limit of the beam group. If the CR of the beam group satisfies the CR limit, then the Tx UE 805 may transmit signals using beams included in the beam group at a same or an increased transmission rate. In some aspects, if the CR of the beam group satisfies the CR limit, then the Tx UE 805 may increase a transmission rate for signals transmitted using beams included in the beam group to improve a communication performance of the signals.

If the CR of the beam group does not satisfy (e.g., exceeds or is within a threshold amount of) the CR limit, then the Tx UE 805 may reduce a transmission rate for signals transmitted using beams included in the beam group to satisfy the CR limit. In some aspects, if the CR of the beam group does not satisfy (e.g., exceeds or is within a threshold amount of) the CR limit, then the Tx UE 805 may stop or suspend transmitting signals using beams included in the beam group to satisfy the CR limit.

In this way, the Tx UE 805 may monitor and/or measure the CR of the beam group to ensure that the CR limit of the beam group is satisfied. By using a beamformed CR in this manner, the Tx UE 805 may identify when the Tx UE 805 is transmitting into a congested or busy part of the network and may adjust the CR limit and/or CR of a beam group (e.g., in the spatial direction of the congested or busy part of the network) accordingly. The Tx UE 805 may set different CR limits for different beam groups (e.g., in a similar manner as described above). This may enable the Tx UE 805 to transmit at a higher transmit rate using a first beam group (e.g., that has a spatial direction towards an idle part of the network and has a higher CR limit), thereby improving communication performance of signals transmitted using the first beam group. Additionally, the Tx UE 805 may transmit at a lower transmit rate using a second beam group (e.g., that has a spatial direction towards a busy or congested part of the network and has a lower CR limit), thereby reducing a likelihood that signals transmitted using the second beam group cause interference and/or collisions.

As indicated above, FIG. 8 is provided as an example. Other examples may differ from what is described with respect to FIG. 8.

Figure 9:
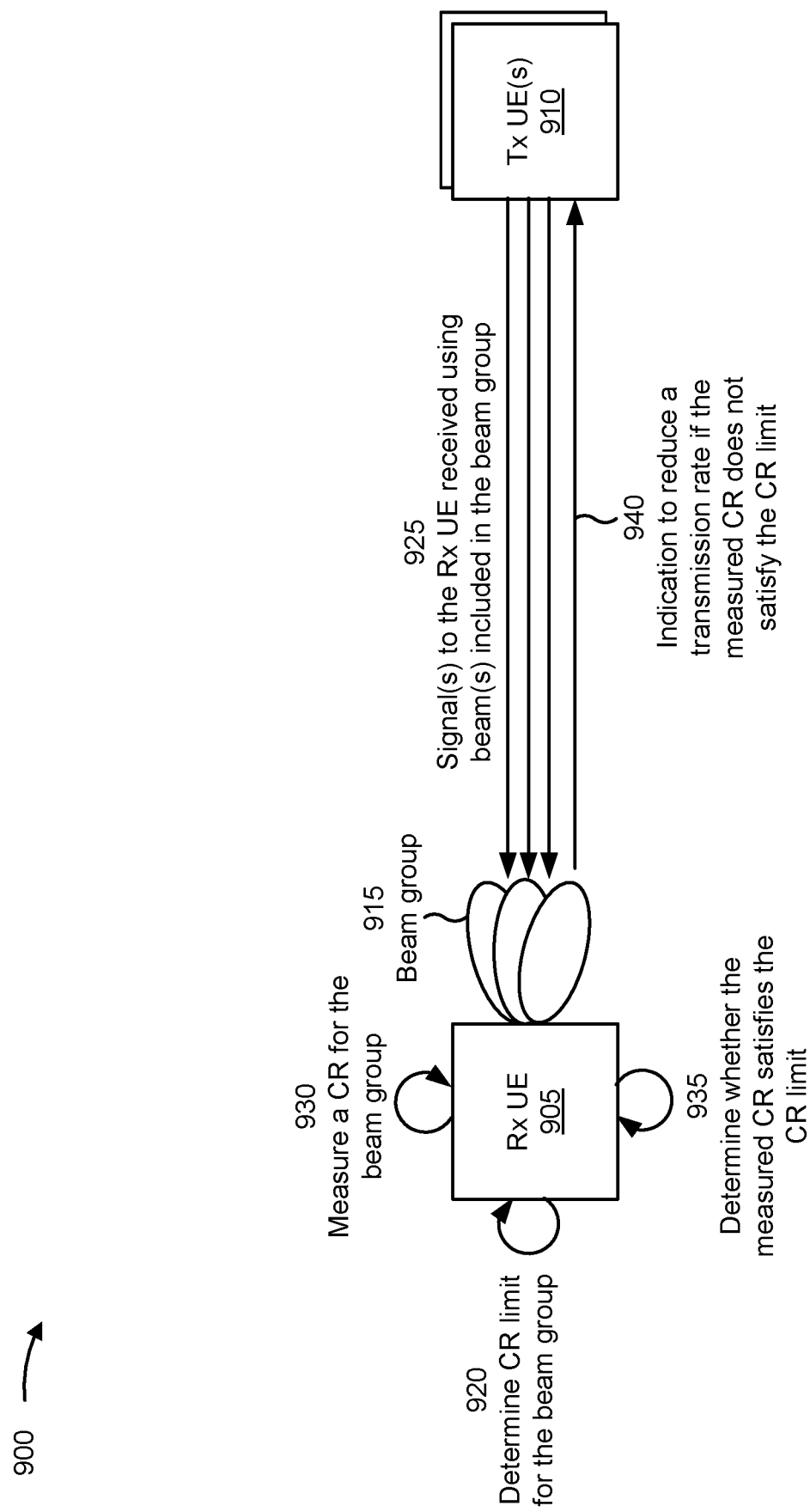

FIG. 9 is a diagram illustrating an example 900 associated with a beamformed CR, in accordance with various aspects of the present disclosure. As shown in FIG. 9, example 900 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5. As shown in FIG. 9, an Rx UE 905 may communicate with one or more Tx UEs 910.

As shown by reference number 915, the Rx UE 905 may use a beam group to receive one or more signals from the one or more Tx UEs 910. The beam group may include one or more beams that have a similar spatial direction (e.g., as described above in connection with FIG. 6).

As shown by reference number 920, the Rx UE 905 may determine a CR limit of the beam group. The Rx UE 905 may determine the CR limit based at least in part on a CBR of the beam group (e.g., an Rx beamformed CBR), a CBR of a Tx UE 910 (e.g., a CBR of a beam group of the Tx UE 910, as described above in connection with FIG. 8), and/or a CR limit of a Tx UE 910 (e.g., a CR limit of a beam group of the Tx UE 910, as described above in connection with FIG. 8), among other examples. For example, the Rx UE 905 may measure a CBR of the beam group using one or more beams included in the beam group. The Rx UE 905 may identify a number of resources (e.g., a number of subchannels) used by nearby Tx UEs 910 based at least in part on signals (e.g., SCI, PSCCH signals, and/or PSSCH signals) transmitted by the Tx UEs 910.

The Rx UE 905 may be configured to monitor channel use in the spatial direction of the beam group to measure a CBR of the beam group. For example, one or more Tx UEs 910 may be transmitting in a spatial direction of the beam group. The signals transmitted by the Tx UE(s) 910 may be intended for another Rx UE (not shown in FIG. 9). The Rx UE 905 may receive, detect, and/or measure signals using one or more beams included in the beam group. For example, the Rx UE 905 may measure an RSSI (e.g., a sidelink RSSI (SL-RSSI)) of the signals using one or more beams included in the beam group. The SL-RSSI may be defined by a wireless communication standard, such as a 3GPP Specification. For example, the SL-RSSI may be a linear average of the total received power observed in a configured subchannel in OFDM symbols of a slot configured for PSCCH and PSSCH (e.g., starting from the second OFDM symbol of the slot).

The Rx UE 905 may measure a CBR (e.g., an Rx CBR) of the beam group based at least in part on the RSSI measurements. For example, the Rx UE 905 may monitor for signals using the beam group to measure the SL-RSSI of the signals (e.g., in a similar manner as described above). The Rx UE 905 may measure the CBR based at least in part on a number of subchannels associated with an SL-RSSI value that satisfies a threshold over a measurement window. The Rx UE 905 may measure the CBR of the beam group (e.g., using measured SL-RSSI on any beam included in the beam group).

As a result, the Rx UE 905 is enabled to determine a channel use in the receive direction (e.g., in the spatial direction of the beam group). For example, if the Rx UE 905 determines a relatively high CBR for the CBR of the beam group, then the CBR may indicate that the channel is busy in the receive direction (e.g., that there is a high number of UEs transmitting in the spatial direction of the beam group). If the Rx UE 905 determines a relatively low CBR for the CBR of the beam group, then the CBR may indicate that the channel is idle in the receive direction (e.g., that there is a low number of UEs transmitting in the spatial direction of the beam group).

The Rx UE 905 may determine the CR limit of the beam group based at least in part on the CBR of the beam group. As the CBR of the beam group may indicate channel use in the receive direction (e.g., in the spatial direction of the beam group), the Rx UE 905 may set the CR limit (e.g., limiting a use of the channel by the Rx UE 905) of the beam group accordingly. In some aspects, the Rx UE 905 may determine the CR limit of the beam group based at least in part on the CBR of the beam group, a CBR for a beam group of a Tx UE 910, and/or a CR limit for a beam group of a Tx UE 910.

As shown by reference number 925, the one or more Tx UEs 910 may transmit, to the Rx UE 905, one or more signals that are received by the Rx UE 905 using beams included in the beam group. A signal may be any transmission, such as a sidelink communication, a PSCCH communication, and/or a PSSCH communication. In some aspects, the one or more signals may be transmitted by the same Tx UE 910. In some aspects, the Rx UE 905 may receive signal(s) from multiple Tx UEs 910 using beams included in the beam group.

As shown by reference number 930, the Rx UE 905 may measure a CR of the beam group. The CR may be based at least in part on the one or more signals (e.g., that are intended for the Rx UE 905) received using the beams included in the beam group. For example, the Rx UE 905 may monitor signals that are intended for the Rx UE 905 and that are received using any beams included in the beam group. The Rx UE 905 may determine and/or measure a number of resources (e.g., a number of subchannels) used by the Rx UE 905 for receiving signals using beams included in the beam group. The Rx UE 905 may determine the CR of the beam group based at least in part on the number of resources (e.g., the number of subchannels) used for receiving the signals, over a measurement window, divided by a total number of available (e.g., configured) subchannels in a transmission pool during the measurement window.

As shown by reference number 935, the Rx UE 905 may determine whether the measured CR of the beam group satisfies the CR limit of the beam group. For example, the Rx UE 905 may compare the CR of the beam group to the CR limit of the beam group. If the CR of the beam group satisfies the CR limit, then the Rx UE 905 may continue to communicate (e.g., receive signals) using beams included in the beam group. In some aspects, if the CR of the beam group satisfies the CR limit, then the Rx UE 905 may transmit an indication to a Tx UE 910 that the CR limit is satisfied (e.g., to enable the Tx UE 910 to increase a transmission rate of signals transmitted to the Rx UE 905).

As shown by reference number 940, if the CR of the beam group does not satisfy (e.g., exceeds or is within a threshold amount of) the CR limit, then the Rx UE 905 may transmit, to at least one Tx UE 910, an indication to reduce a transmission rate of transmissions to the Rx UE 905 (or stop/suspend transmissions to the Rx UE 905). In this way, the Rx UE 905 may monitor and/or measure the CR of the beam group to ensure that the CR limit of the beam group is satisfied. By using a beamformed CR in this manner, the Rx UE 905 may identify when the Rx UE 905 is receiving signals from a congested or busy part of the network and may adjust the CR limit and/or CR of a beam group (e.g., in the spatial direction of the congested or busy part of the network) accordingly. Additionally, the Rx UE 905 may notify a Tx UE 910 when the CR limit of the beam group is not satisfied. This may enable the Tx UE 910 to adjust (e.g., reduce) a transmission rate of signals to the Rx UE 905, thereby reducing a likelihood that signals received by the Rx UE 905 using the beam group cause interference and/or collisions.

As indicated above, FIG. 9 is provided as an example. Other examples may differ from what is described with respect to FIG. 9.

Figure 10:
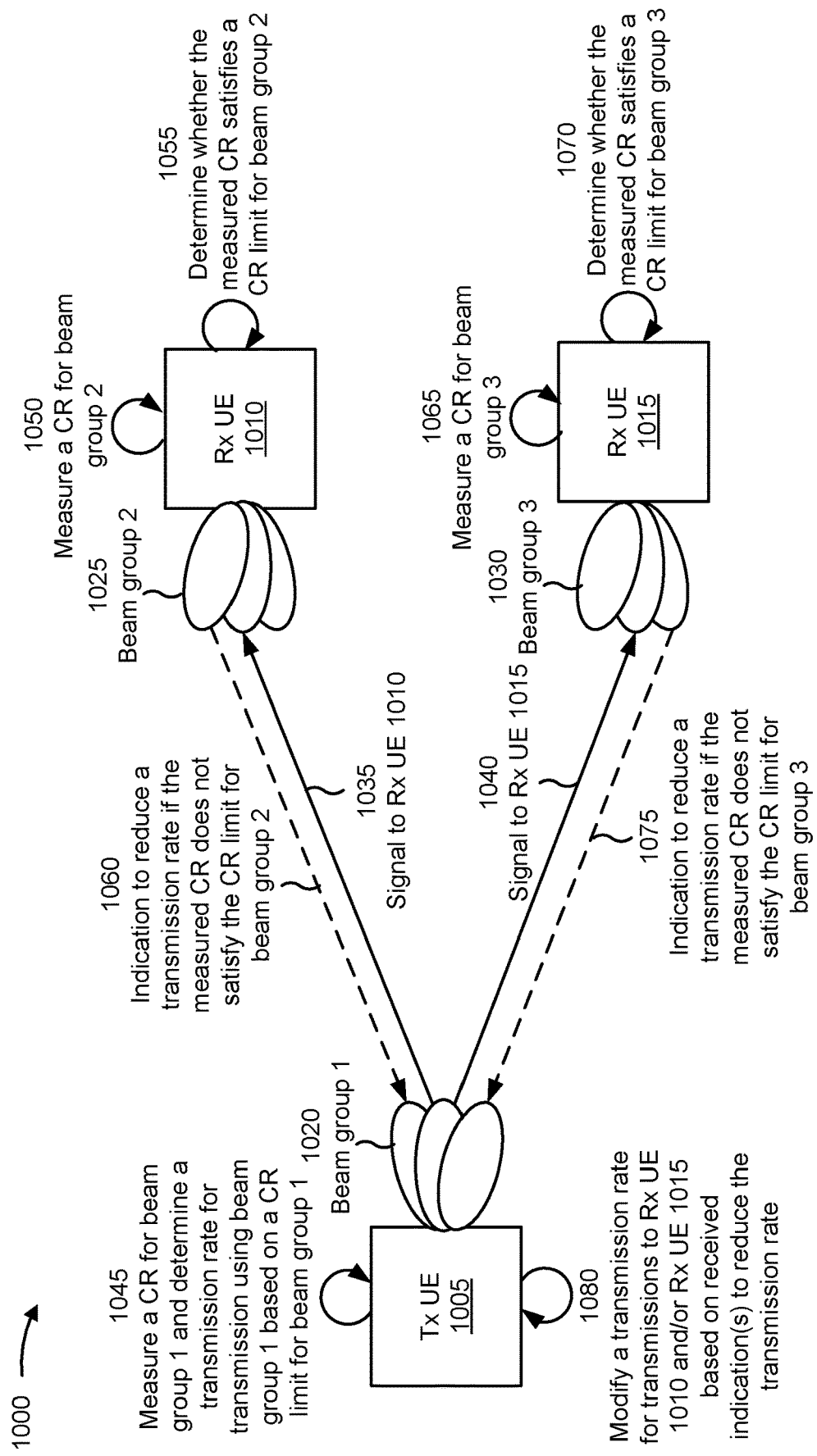

FIG. 10 is a diagram illustrating an example 1000 associated with a beamformed CR, in accordance with various aspects of the present disclosure. As shown in FIG. 10, example 1000 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5. As shown in FIG. 10, an Tx UE 1005 may communicate with an Rx UE 1010 and an Rx UE 1015.

As shown in FIG. 10, and by reference number 1020, the Tx UE 1005 may transmit signals (e.g., to the Rx UE 1010 and/or the Rx UE 1015) using a first beam group (e.g., beam group 1). As shown by reference number 1025, the Rx UE 1010 may receive signals (e.g., from the Tx UE 1005 and/or other Tx UEs) using a second beam group (e.g., beam group 2). As shown by reference number 1030, the Rx UE 1015 may receive signals (e.g., from the Tx UE 1005 and/or other Tx UEs) using a third beam group (e.g., beam group 3).

The UEs shown in FIG. 10 may determine CR limits for beam groups of the UEs in a similar manner as described above in connection with FIGS. 8 and/or 9. For example, the Tx UE 1005 may determine a CR limit for the first beam group in a similar manner as described above in connection with FIG. 8. The Rx UE 1010 may determine a CR limit for the second beam group in a similar manner as described above in connection with FIG. 9. The Rx UE 1015 may determine a CR limit for the third beam group in a similar manner as described above in connection with FIG. 9.

As shown by reference number 1035, the Tx UE 1005 may transmit a signal to the Rx UE 1010 using a beam included in the first beam group. The Rx UE 1010 may receive the signal using a beam included in the second beam group. Similarly, as shown by reference number 1040, the Tx UE 1005 may transmit a signal to the Rx UE 1015 using a beam (e.g., the same beam as described above or a different beam) included in the first beam group. The Rx UE 1015 may receive the signal using a beam included in the third beam group.

As shown by reference number 1045, the Tx UE 1005 may measure a CR for the first beam group based at least in part on the signal transmitted to the Rx UE 1010 and the signal transmitted to the Rx UE 1015 (and/or any other signals transmitted using beams included in the first beam group during a measurement window). The Tx UE 1005 may measure the CR for the first beam group in a similar manner as described above in connection with FIG. 8. For example, the Tx UE 1005 may measure the CR for the first beam group based at least in part on resources used for transmitting signals, using beams included in the first beam group, during a measurement window.

The Tx UE 1005 may determine, modify, and/or adjust a transmission rate for signals that are transmitted using beams included in the first beam group based at least in part on the CR of the first beam group. For example, as described above in connection with FIG. 8, the Tx UE 1005 may compare the CR of the first beam group to the CR limit of the first beam group. If the CR of the first beam group satisfies the CR limit of the first beam group, then the Tx UE 1005 may maintain or increase the transmission rate for signals that are transmitted using beams included in the first beam group. If the CR of the first beam group does not satisfy the CR limit of the first beam group, then the Tx UE 1005 may reduce the transmission rate for signals that are transmitted using beams included in the first beam group and/or stop or suspend transmitting signals using beams included in the first beam group.

As shown by reference number 1050, the Rx UE 1010 may measure a CR for the second beam group based at least in part on signals received by the Rx UE 1010 using beams included in the second beam group. The Rx UE 1010 may measure the CR for the second beam group in a similar manner as described above in connection with FIG. 9. For example, the Rx UE 1010 may measure the CR for the second beam group based at least in part on resources used for receiving signals intended for the Rx UE 1010, using beams included in the second beam group, during a measurement window.

As shown by reference number 1055, the Rx UE 1010 may determine whether the measured CR of the second beam group satisfies the CR limit for the second beam group. If the CR of the second beam group satisfies the CR limit of the second beam group, then the Rx UE 1010 may continue to receive signals using beams included in the second beam group. As shown by reference number 1060, if the CR of the second beam group does not satisfy the CR limit of the second beam group, then the Rx UE 1010 may transmit, to the Tx UE 1005, an indication to reduce a transmission rate of signals that are to be transmitted to the Rx UE 1010. This may enable the Tx UE 1005 to reduce the transmission rate of signals that are to be transmitted to the Rx UE 1010 (e.g., by the Tx UE 1005) to ensure that the CR of the second beam group satisfies the CR limit of the second beam group, as described in more detail below.

As shown by reference number 1065, the Rx UE 1015 may measure a CR for the third beam group based at least in part on signals received by the Rx UE 1015 using beams included in the third beam group. The Rx UE 1015 may measure the CR for the third beam group in a similar manner as described above in connection with FIG. 9. For example, the Rx UE 1015 may measure the CR for the third beam group based at least in part on resources used for receiving signals intended for the Rx UE 1015, using beams included in the third beam group, during a measurement window.

As shown by reference number 1070, the Rx UE 1015 may determine whether the measured CR of the third beam group satisfies the CR limit for the third beam group. If the CR of the third beam group satisfies the CR limit of the third beam group, then the Rx UE 1015 may continue to receive signals using beams included in the third beam group. As shown by reference number 1075, if the CR of the third beam group does not satisfy the CR limit of the third beam group, then the Rx UE 1015 may transmit, to the Tx UE 1005, an indication to reduce a transmission rate of signals that are to be transmitted to the Rx UE 1015. This may enable the Tx UE 1005 to reduce the transmission rate of signals that are to be transmitted to the Rx UE 1015 (e.g., by the Tx UE 1005) to ensure that the CR of the third beam group satisfies the CR limit of the third beam group, as described in more detail below.

As shown by reference number 1080, the Tx UE 1005 may modify a transmission rate (e.g., a number of resources or subchannels used over an amount of time) for the Rx UE 1010 and/or for the Rx UE 1015 based at least in part on one or more received indications to reduce the transmission rate, as described above. For example, the Tx UE 1005 may receive, from the Rx UE 1010, an indication to reduce a transmission rate of signals that are to be transmitted to the Rx UE 1010 by the Tx UE 1005. As a result, the Tx UE 1005 may reduce the transmission rate of signals that are to be transmitted to the Rx UE 1010 (e.g., that are to be transmitted using the first beam group and/or are to be received using the second beam group). Similarly, the Tx UE 1005 may receive, from the Rx UE 1015, an indication to reduce a transmission rate of signals that are to be transmitted to the Rx UE 1015 by the Tx UE 1005. As a result, the Tx UE 1005 may reduce the transmission rate of signals that are to be transmitted to the Rx UE 1015 (e.g., that are to be transmitted using the first beam group and/or are to be received using the third beam group). This ensures that the CR limit for the second beam group and/or the CR limit for the third beam group can be satisfied. As described above, ensuring that a CR limit for a beam group is satisfied reduces a likelihood or probability of signals transmitted or received using the beam group causing interference or collisions.

In some aspects, if the Tx UE 1005 receives an indication to reduce a transmission rate of signals that are to be transmitted to first Rx UE, then the Tx UE 1005 may reduce the transmission rate of signals that are to be transmitted to a first Rx UE (e.g., using a beam included in the first beam group) and may increase a transmission rate of signals that are to be transmitted to a second Rx UE (e.g., using a beam included in the first beam group). That is, the Tx UE 1005 may take advantage of the reduced transmission rate to one Rx UE by increasing a transmission rate to a second Rx UE (e.g., while still ensuring that the CR of the first beam group satisfies the CR limit of the first beam group). For example, the Tx UE 1005 may receive, from the Rx UE 1010, an indication to reduce a transmission rate of signals that are to be transmitted to the Rx UE 1010 by the Tx UE 1005. As a result, the Tx UE 1005 may reduce the transmission rate of signals that are to be transmitted to the Rx UE 1010 (e.g., that are to be transmitted using the first beam group and/or are to be received using the second beam group). Additionally, the Tx UE 1005 may increase a transmission rate of signals that are to be transmitted to the Rx UE 1015 by the Tx UE 1005 (e.g., using a beam included in the first beam group). This may enable the Tx UE 1005 to reduce a likelihood or probability of signals transmitted to the Rx UE 1010 causing interference or collisions, while also improving a communication performance of signals transmitted to the Rx UE 1015.

As indicated above, FIG. 10 is provided as an example. Other examples may differ from what is described with respect to FIG. 10.

Figure 11:
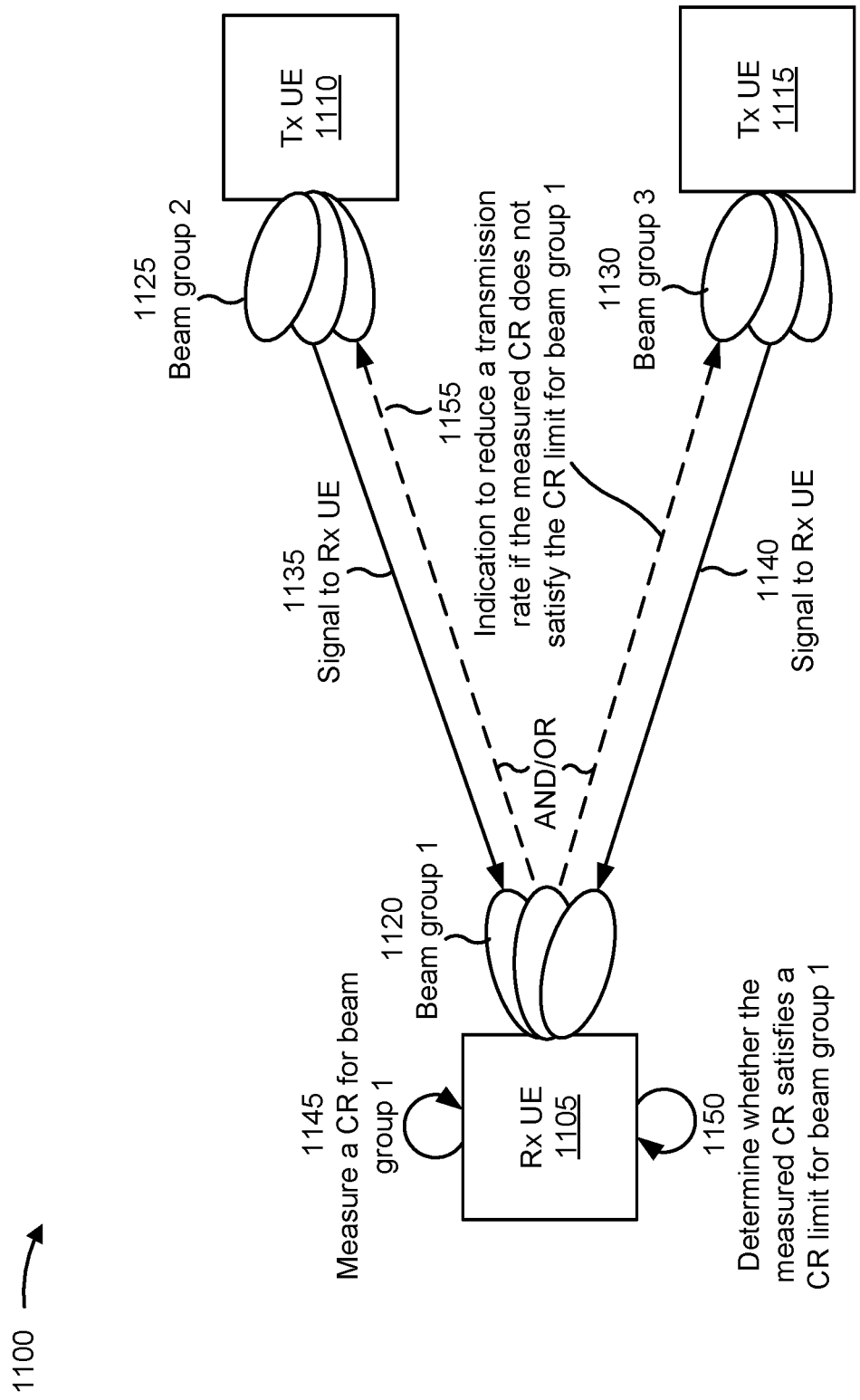

FIG. 11 is a diagram illustrating an example 1100 associated with a beamformed CR, in accordance with various aspects of the present disclosure. As shown in FIG. 11, example 1100 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5. As shown in FIG. 11, an Rx UE 1105 may communicate with a Tx UE 1110 and a Tx UE 1115.

As shown in FIG. 11, and by reference number 1120, the Rx UE 1105 may receive signals (e.g., from the Tx UE 1110 and/or the Tx UE 1115) using a first beam group (e.g., beam group 1). As shown by reference number 1125, the Tx UE 1110 may transmit signals (e.g., to the Rx UE 1105 and/or other Rx UEs) using a second beam group (e.g., beam group 2). As shown by reference number 1130, the Tx UE 1115 may transmit signals (e.g., to the Rx UE 1105 and/or other Rx UEs) using a third beam group (e.g., beam group 3).

The UEs shown in FIG. 11 may determine CR limits for beam groups of the UEs in a similar manner as described above in connection with FIGS. 8 and/or 9. For example, the Rx UE 1105 may determine a CR limit for the first beam group in a similar manner as described above in connection with FIG. 9. The Tx UE 1110 may determine a CR limit for the second beam group in a similar manner as described above in connection with FIG. 8. The Tx UE 1115 may determine a CR limit for the third beam group in a similar manner as described above in connection with FIG. 8.

As shown by reference number 1135, the Tx UE 1110 may transmit a signal to the Rx UE 1105 using a beam included in the second beam group. The Rx UE 1105 may receive the signal using a beam included in the first beam group. Similarly, as shown by reference number 1140, the Tx UE 1115 may transmit a signal to the Rx UE 1105 using a beam included in the third beam group. The Rx UE 1105 may receive the signal using a beam (e.g., the same beam as described above or a different beam) included in the first beam group.

As shown by reference number 1145, the Rx UE 1105 may measure a CR for the first beam group based at least in part on signals (e.g., from the Tx UE 1110 and the Tx UE 1115) received using beams included in the first beam group. The Rx UE 1105 may measure the CR for the first beam group in a similar manner as described above in connection with FIG. 9 and/or FIG. 10. For example, the Rx UE 1105 may measure the CR for the first beam group based at least in part on resources used for receiving signals intended for the Rx UE 1105, using beams included in the first beam group, during a measurement window.

As shown by reference number 1150, the Rx UE 1105 may determine whether the measured CR of the first beam group satisfies the CR limit for the first beam group, as described above in connection with FIGS. 9 and/or 10. If the CR of the first beam group satisfies the CR limit of the first beam group, then the Rx UE 1105 may continue to receive signals using beams included in the first beam group.

As shown by reference number 1155, if the CR of the first beam group does not satisfy the CR limit of the first beam group, then the Rx UE 1105 may transmit, to the Tx UE 1110 and/or the Tx UE 1115, an indication to reduce a transmission rate of signals that are to be transmitted to the Rx UE 1105. This may enable the Tx UE 1110 and/or the Tx UE 1115 to reduce the transmission rate of signals that are to be transmitted to the Rx UE 1105 to ensure that the CR of the first beam group satisfies the CR limit of the first beam group, as described above in connection with FIGS. 9 and/or 10. In some aspects, the Rx UE 1105 may identify a Tx UE (or multiple Tx UEs) to transmit the indication to reduce a transmission rate of signals that are to be transmitted to the Rx UE 1105 based at least in part on a current transmission rate of the Tx UE and/or a schedule of upcoming transmissions to the Rx UE 1105. For example, the Rx UE 1105 may transmit the indication to reduce a transmission rate of signals that are to be transmitted to the Rx UE 1105 to a Tx UE (or multiple Tx UEs) with a highest transmission rate. In some aspects, the Rx UE 1105 may transmit the indication to reduce a transmission rate of signals that are to be transmitted to the Rx UE 1105 to a Tx UE (or multiple Tx UEs) that are scheduled to transmit signals to the Rx UE 1105 in the future.

As indicated above, FIG. 11 is provided as an example. Other examples may differ from what is described with respect to FIG. 11.

Figure 12:
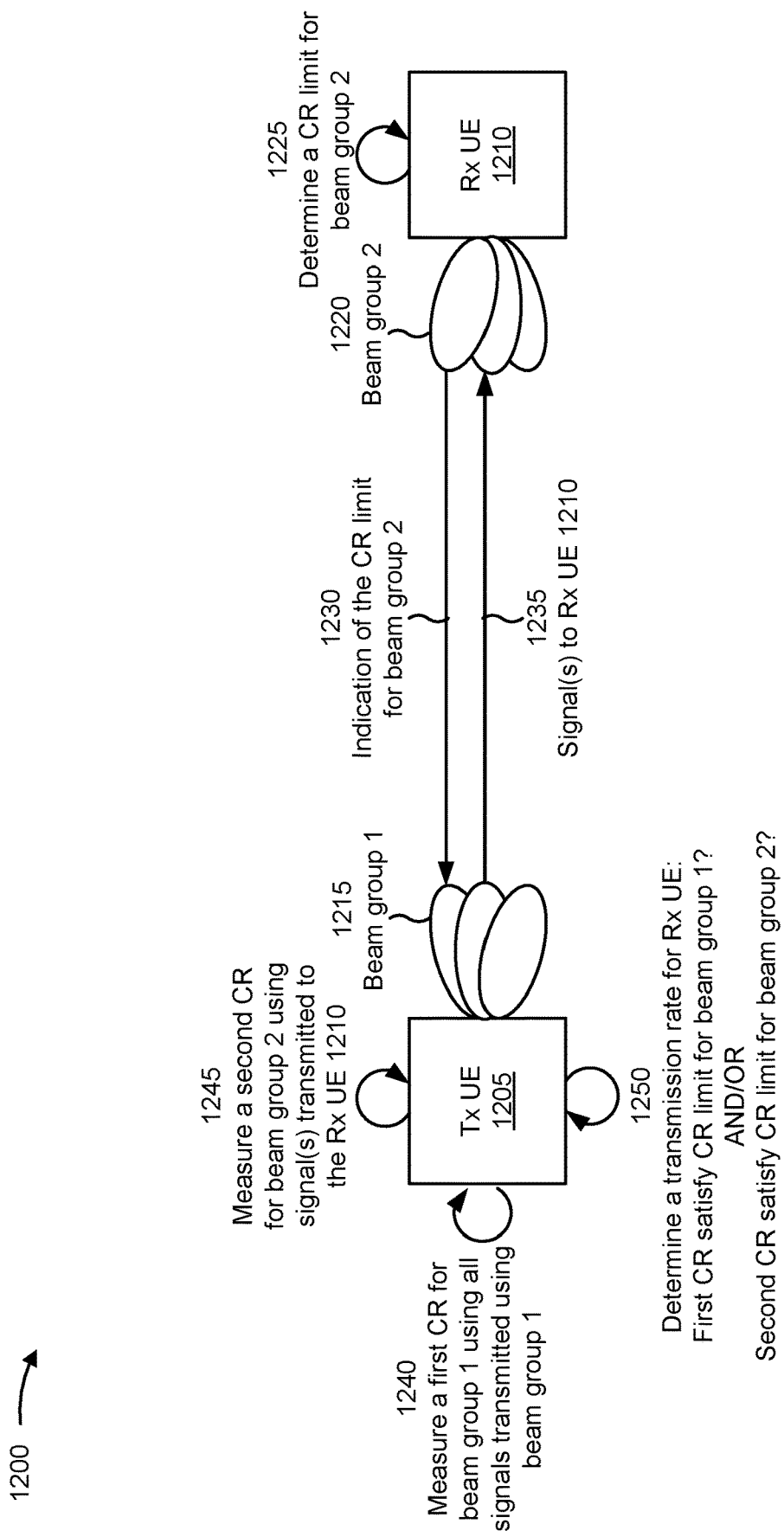

FIG. 12 is a diagram illustrating an example 1200 associated with a beamformed CR, in accordance with various aspects of the present disclosure. As shown in FIG. 12, example 1200 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5. As shown in FIG. 12, a Tx UE 1205 may communicate with an Rx UE 1210.

As shown in FIG. 12, and by reference number 1215, the Tx UE 1205 may transmit signals (e.g., to the Rx UE 1210) using a first beam group (e.g., beam group 1). As shown by reference number 1220, the Rx UE 1210 may receive signals (e.g., from the Tx UE 1205) using a second beam group (e.g., beam group 2).

The UEs shown in FIG. 12 may determine CR limits for beam groups of the UEs in a similar manner as described above in connection with FIGS. 8 and/or 9. For example, the Tx UE 1205 may determine a CR limit for the first beam group in a similar manner as described above in connection with FIG. 8. As shown by reference number 1225, the Rx UE 1210 may determine a CR limit for the second beam group in a similar manner as described above in connection with FIG. 9.

As shown by reference number 1230, the Rx UE 1210 may transmit, to the Tx UE 1205, an indication of the CR limit for the second beam group. For example, the Rx UE 1210 may determine that the Tx UE 1205 is to monitor the CR for the second beam group and ensure that the CR limit for the second beam group is satisfied. For example, the Rx UE 1210 may be in a scenario where the Rx UE 1210 expects to only receive signals from the Tx UE 1205 (e.g., for a period of time). Therefore, the Rx UE 1210 may transmit the indication of the CR limit for the second beam group to enable the Tx UE 1205 to monitor and/or measure the CR for the second beam group and independently ensure that the CR limit for the second beam group is satisfied (e.g., without receiving an indication from the Rx UE 1210).

As shown by reference number 1235, the Tx UE 1205 may transmit one or more signals to the Rx UE 1210 using one or more beams included in the first beam group. The Rx UE 1210 may receive the one or more signals using one or more beams included in the second beam group. Additionally, the Tx UE 1205 may transmit one or more signals to other Rx UE(s) using one or more beams included in the first beam group.

As shown by reference number 1240, the Tx UE 1205 may measure a first CR for the first beam group using all signals (e.g., to the Rx UE 1210 and/or other Rx UEs) transmitted using beams included in the first beam group. The Tx UE 1205 may measure the first CR for the first beam group in a similar manner as described above in connection with FIGS. 8, 9, 10, and/or 11. For example, the Tx UE 1205 may measure the first CR for the first beam group based at least in part on resources used for transmitting signals, using beams included in the first beam group, during a measurement window.

As shown by reference number 1245, the Tx UE 1205 may measure a second CR for the second beam group using signals that are transmitted to the Rx UE 1210 by the Tx UE 1205. The Tx UE 1205 may measure the second CR only using signals that are transmitted to the Rx UE 1210 (e.g., and not signals transmitted to other Rx UEs). For example, the Tx UE 1205 may measure the second CR of the second beam group based at least in part on resources used for transmitting signals to the Rx UE 1210, using beams included in the first beam group, during a measurement window.

As shown by reference number 1250, the Tx UE 1250 may determine, adjust, and/or modify a transmission rate for signals to be transmitted to the Rx UE 1210 based at least in part on the first CR and the second CR. For example, the Tx UE 1205 may determine whether the first CR satisfies the CR limit of the first beam group. If the first CR does not satisfy the CR limit of the first beam group, then the Tx UE 1205 may reduce a transmission rate for signals to be transmitted to the Rx UE 1210 (and/or other Rx UEs) using beams included in the first beam group to satisfy the CR limit of the first beam group. Additionally, or alternatively, the Tx UE 1205 may determine whether the second CR satisfies the CR limit of the second beam group. If the second CR does not satisfy the CR limit for the second beam group, then the Tx UE 1205 may reduce a transmission rate for signals to be transmitted to the Rx UE 1210 using beams included in the first beam group to satisfy the CR limit of the second beam group.

In this way, the Tx UE 1205 may be enabled to ensure that the CR limit of the first beam group (e.g., of the Tx UE 1205) and the CR limit of the second beam group (e.g., of the Rx UE 1210) are both satisfied. As described above, ensuring that a CR limit for a beam group is satisfied reduces a likelihood or probability of signals transmitted or received using the beam group causing interference or collisions. Additionally, enabling the Tx UE 1205 to monitor the CR limit for the second beam group (e.g., of the Rx UE 1210) reduces a latency associated with identifying when the CR limit for the second beam is not satisfied (e.g., due to a delay caused by the Rx UE 1210 transmitting an indication that the CR limit for the second beam is not satisfied).

As indicated above, FIG. 12 is provided as an example. Other examples may differ from what is described with respect to FIG. 12.

Figure 13:
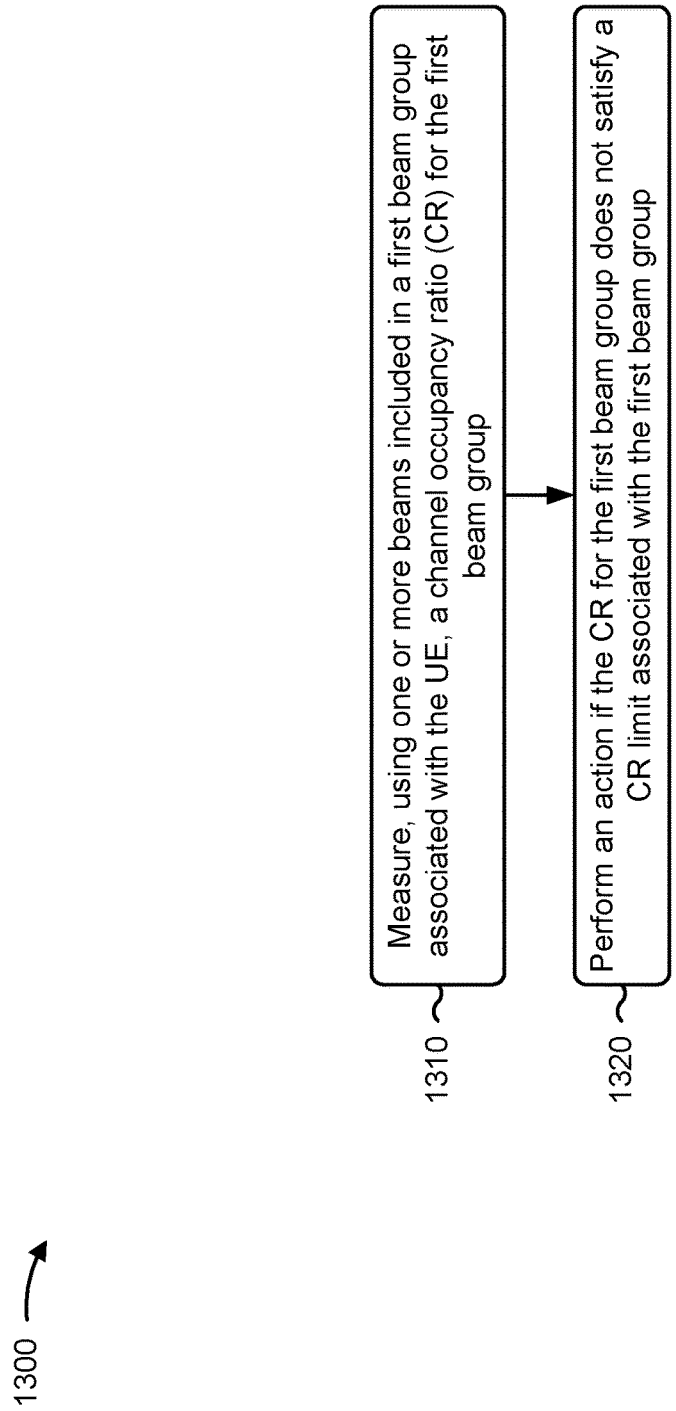
FIG. 13 is a diagram illustrating an example process associated with a beamformed CR, in accordance with various aspects of the present disclosure.

FIG. 13 is a diagram illustrating an example process 1300 performed, for example, by a UE, in accordance with various aspects of the present disclosure. Example process 1300 is an example where the UE (e.g., UE 120, a Tx UE, and/or an Rx UE) performs operations associated with a beamformed CR.

As shown in FIG. 13, in some aspects, process 1300 may include measuring, using one or more beams included in a first beam group associated with the UE, a CR for the first beam group (block 1310). For example, the UE (e.g., using CR measurement component 1408, depicted in FIG. 14) may measure, using one or more beams included in a first beam group associated with the UE, a CR for the first beam group, as described above.

As further shown in FIG. 13, in some aspects, process 1300 may include performing an action if the CR for the first beam group does not satisfy a CR limit associated with the first beam group (block 1320). For example, the UE (e.g., using determination component 1410 and/or transmission component 1404, depicted in FIG. 14) may perform an action if the CR for the first beam group does not satisfy a CR limit associated with the first beam group, as described above.

Process 1300 may include additional aspects, such as any single aspect or any combination of aspects described below and/or in connection with one or more other processes described elsewhere herein.

In a first aspect, process 1300 includes determining the CR limit associated with the first beam group based at least in part on at least one of a first CBR for the first beam group, a second CBR associated with another UE that is communicating with the UE, or a second CR limit associated with the other UE.

In a second aspect, alone or in combination with the first aspect, process 1300 includes measuring, using one or more beams included in the first beam group, a CBR for the first beam group, and determining the CR limit associated with the first beam group based at least in part on the CBR for the first beam group.

In a third aspect, alone or in combination with one or more of the first and second aspects, measuring the CR for the first beam group includes measuring the CR based at least in part on a number of subchannels used for transmitting signals using beams included in the first beam group, or measuring the CR based at least in part on a number of subchannels used for receiving signals using beams included in the first beam group.

In a fourth aspect, alone or in combination with one or more of the first through third aspects, performing the action if the CR for the first beam group does not satisfy the CR limit associated with the first beam group includes reducing a transmission rate of transmissions using beams included in the first beam group.

In a fifth aspect, alone or in combination with one or more of the first through third aspects, performing the action if the CR for the first beam group does not satisfy the CR limit associated with the first beam group includes transmitting, to a transmitter device, a request to reduce a transmission rate of transmissions that are to be received by the UE using beams included in the first beam group.

In a sixth aspect, alone or in combination with one or more of the first through fifth aspects, process 1300 includes receiving, from a receiver device, a request to reduce a transmission rate of transmissions to the receiver device, and reducing the transmission rate of transmissions to the receiver device for transmissions by the UE that use one or more beams included in the first beam group based at least in part on receiving the request.

In a seventh aspect, alone or in combination with the sixth aspect, process 1300 includes increasing a transmission rate of transmissions to a second receiver device for transmissions by the UE that use one or more beams included in the first beam group based at least in part on reducing the transmission rate of transmissions to the receiver device.

In an eighth aspect, alone or in combination with one or more of the first through seventh aspects, measuring the CR for the first beam group includes receiving, from a first transmitter device, a first signal using a beam included in the first beam group, receiving, from a second transmitter device, a second signal using the beam or another beam included in the first beam group, and measuring the CR based at least in part on the first signal and the second signal, where performing the action if the CR for the first beam group does not satisfy the CR limit associated with the first beam group includes transmitting a request to reduce a transmission rate of transmissions that are to be received by the UE using beams included in the first beam group to at least one of the first transmitter device or the second transmitter device.

In a ninth aspect, alone or in combination with one or more of the first through eighth aspects, process 1300 includes receiving, from a receiver device, an indication of a second CR limit associated with the receiver device, measuring a second CR for the receiver device based at least in part on transmissions to the receiver device that use a beam included in the first beam group, and determining a transmission rate for transmissions to the receiver device based at least in part on the second CR and the second CR limit.

In a tenth aspect, alone or in combination with one or more of the first through eighth aspects, process 1300 includes transmitting, to a transmitter device, an indication of the CR limit for the first beam group, and receiving, from the transmitter device, one or more signals at a transmission rate that is based at least in part on the CR limit.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
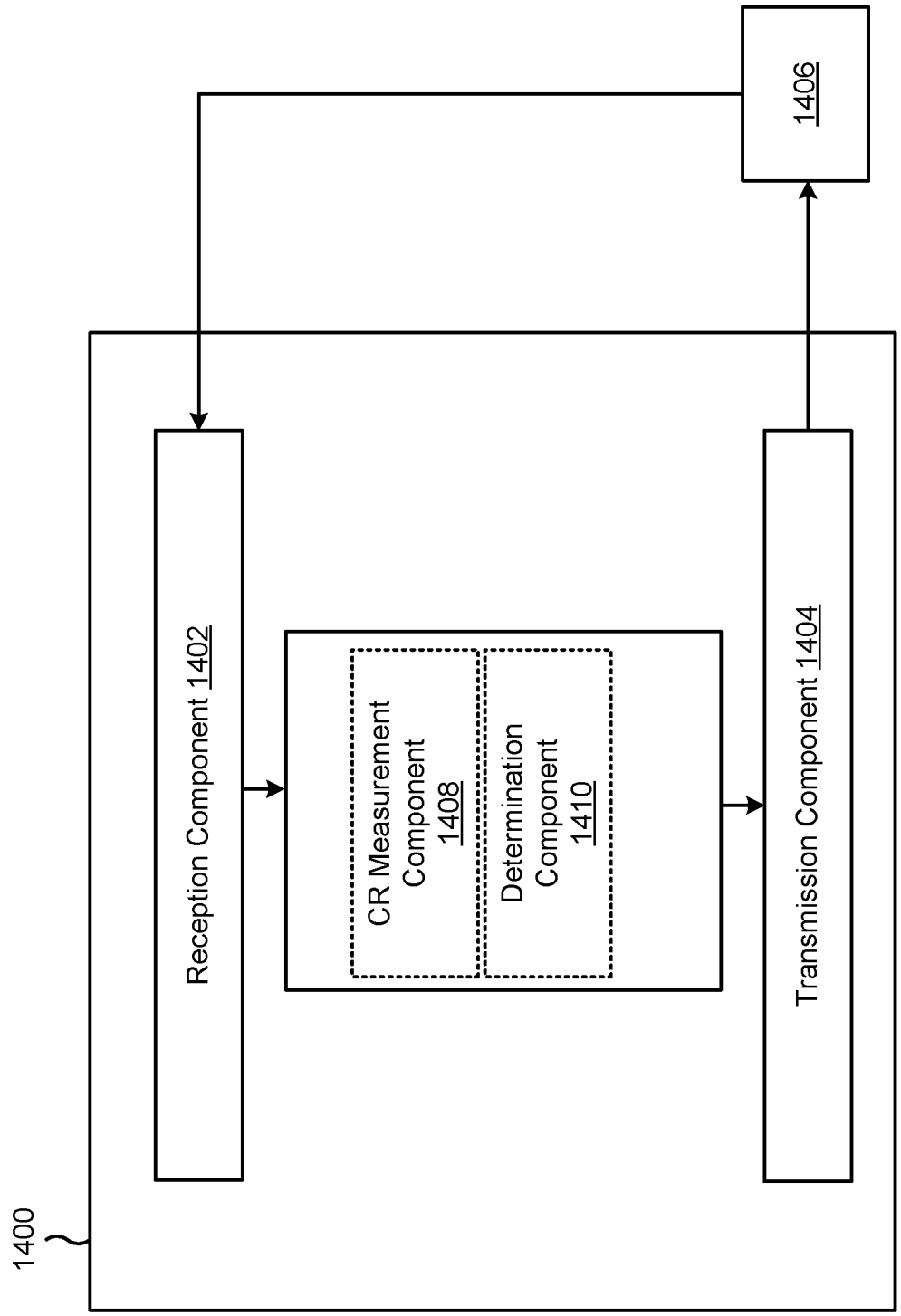
FIG. 14 is a block diagram of an example apparatus for wireless communication, in accordance with various aspects of the present disclosure.

FIG. 14 is a block diagram of an example apparatus 1400 for wireless communication. The apparatus 1400 may be a UE (e.g., a Tx UE and/or an Rx UE as referred to herein), or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a CR measurement component 1408, and/or a determination component 1410, among other examples.

In some aspects, the apparatus 1400 may be configured to perform one or more operations described herein in connection with FIGS. 8, 9, 10, 11, and/or 12. Additionally, or alternatively, the apparatus 1400 may be configured to perform one or more processes described herein, such as process 1300 of FIG. 13, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The CR measurement component 1408 may measure, using one or more beams included in a first beam group associated with the UE, a CR for the first beam group. The determination component 1410 and/or the transmission component 1404 may perform an action if the CR for the first beam group does not satisfy a CR limit associated with the first beam group.

The determination component 1410 may determine the CR limit associated with the first beam group based at least in part on at least one of a first CBR for the first beam group, a second CBR associated with another UE that is communicating with the UE, or a second CR limit associated with the other UE.

The CR measurement component 1408 may measure, using one or more beams included in the first beam group, a CBR for the first beam group. The determination component 1410 may determine the CR limit associated with the first beam group based at least in part on the CBR for the first beam group.

The reception component 1402 may receive, from a receiver device, a request to reduce a transmission rate of transmissions to the receiver device.

The determination component 1410 may reduce the transmission rate of transmissions to the receiver device for transmissions by the apparatus 1400 that use one or more beams included in the first beam group based at least in part on receiving the request.

The determination component 1410 may increase a transmission rate of transmissions to a second receiver device for transmissions by the apparatus 1400 that use one or more beams included in the first beam group based at least in part on reducing the transmission rate of transmissions to the receiver device.

The reception component 1402 may receive, from a receiver device, an indication of a second CR limit associated with the receiver device. The CR measurement component 1408 may measure a second CR for the receiver device based at least in part on transmissions to the receiver device that use a beam included in the first beam group. The determination component 1410 may determine a transmission rate for transmissions to the receiver device based at least in part on the second CR and the second CR limit.

The transmission component 1404 may transmit, to a transmitter device, an indication of the CR limit for the first beam group. The reception component 1402 may receive, from the transmitter device, one or more signals at a transmission rate that is based at least in part on the CR limit.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some aspects of the present disclosure:

Aspect 1: A method of wireless communication performed by a user equipment (UE), comprising: measuring, using one or more beams included in a first beam group associated with the UE, a channel occupancy ratio (CR) for the first beam group; and performing an action if the CR for the first beam group does not satisfy a CR limit associated with the first beam group.

Aspect 2: The method of aspect 1, further comprising: determining the CR limit associated with the first beam group based at least in part on at least one of: a first channel busy ratio (CBR) for the first beam group, a second CBR associated with another UE that is communicating with the UE, or a second CR limit associated with the other UE.

Aspect 3: The method of any of aspects 1-2, further comprising: measuring, using one or more beams included in the first beam group, a channel busy ratio (CBR) for the first beam group; and determining the CR limit associated with the first beam group based at least in part on the CBR for the first beam group.

Aspect 4: The method of any of aspects 1-3, wherein measuring the CR for the first beam group comprises: measuring the CR based at least in part on a number of subchannels used for transmitting signals using beams included in the first beam group; or measuring the CR based at least in part on a number of subchannels used for receiving signals using beams included in the first beam group.

Aspect 5: The method of any of aspects 1-4, wherein performing the action if the CR for the first beam group does not satisfy the CR limit associated with the first beam group comprises: reducing a transmission rate of transmissions using beams included in the first beam group.

Aspect 6: The method of any of aspects 1-4, wherein performing the action if the CR for the first beam group does not satisfy the CR limit associated with the first beam group comprises: transmitting, to a transmitter device, a request to reduce a transmission rate of transmissions that are to be received by the UE using beams included in the first beam group.

Aspect 7: The method of any of aspects 1-6, further comprising: receiving, from a receiver device, a request to reduce a transmission rate of transmissions to the receiver device; and reducing the transmission rate of transmissions to the receiver device for transmissions by the UE that use one or more beams included in the first beam group based at least in part on receiving the request.

Aspect 8: The method of aspect 7, further comprising: increasing a transmission rate of transmissions to a second receiver for transmissions by the UE device that use one or more beams included in the first beam group based at least in part on reducing the transmission rate of transmissions to the receiver device.

Aspect 9: The method of any of aspects 1-8, wherein measuring the CR for the first beam group comprises: receiving, from a first transmitter device, a first signal using a beam included in the first beam group; receiving, from a second transmitter device, a second signal using the beam or another beam included in the first beam group; and measuring the CR based at least in part on the first signal and the second signal, wherein performing the action if the CR for the first beam group does not satisfy the CR limit associated with the first beam group comprises: transmitting a request to reduce a transmission rate of transmissions that are to be received by the UE using beams included in the first beam group to at least one of the first transmitter device or the second transmitter device.

Aspect 10: The method of any of aspects 1-9, further comprising: receiving, from a receiver device, an indication of a second CR limit associated with the receiver device; and measuring a second CR for the receiver device based at least in part on transmissions to the receiver device that use a beam included in the first beam group; and determining a transmission rate for transmissions to the receiver device based at least in part on the second CR and the second CR limit.

Aspect 11: The method of any of aspects 1-9, further comprising: transmitting, to a transmitter device, an indication of the CR limit for the first beam group; and receiving, from the transmitter device, one or more signals at a transmission rate that is based at least in part on the CR limit.

Aspect 12: An apparatus for wireless communication at a device, comprising a processor; memory coupled with the processor; and instructions stored in the memory and executable by the processor to cause the apparatus to perform the method of one or more aspects of aspects 1-11.

Aspect 13: A device for wireless communication, comprising a memory and one or more processors coupled to the memory, the memory and the one or more processors configured to perform the method of one or more aspects of aspects 1-11.

Aspect 14: An apparatus for wireless communication, comprising at least one means for performing the method of one or more aspects of aspects 1-11.

Aspect 15: A non-transitory computer-readable medium storing code for wireless communication, the code comprising instructions executable by a processor to perform the method of one or more aspects of aspects 1-11.

Aspect 16: A non-transitory computer-readable medium storing a set of instructions for wireless communication, the set of instructions comprising one or more instructions that, when executed by one or more processors of a device, cause the device to perform the method of one or more aspects of aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive, from a first transmitter device, a first signal using a beam of a plurality of beams included in a first beam group associated with the UE;
      receive, from a second transmitter device, a second signal using the beam or another beam included in the first beam group;
      measure, based at least in part on the first signal and the second signal, a channel occupancy ratio (CR) for the first beam group; and
      perform an action if the CR for the first beam group does not satisfy a CR limit associated with the first beam group,
      wherein the action includes transmitting, to at least one of the first transmitter device or the second transmitter device, a request to reduce a transmission rate of transmissions that are to be received by the UE using beams included in the first beam group.

2. The UE of claim 1, wherein the CR limit associated with the first beam group is determined based at least in part on at least one of a first channel busy ratio (CBR) associated with another UE that is communicating with the UE, a second CR limit associated with the other UE, or a second CBR for the first beam group.

3. The UE of claim 1, wherein the one or more processors are further configured to:
   measure, using one or more beams included in the first beam group, a channel busy ratio (CBR) for the first beam group; and
   determine the CR limit associated with the first beam group based at least in part on the CBR for the first beam group.

4. The UE of claim 1, wherein the one or more processors, when measuring the CR for the first beam group, are configured to:
   measure the CR based at least in part on a number of subchannels used for transmitting signals using beams included in the first beam group; or
   measure the CR based at least in part on a number of subchannels used for receiving signals using beams included in the first beam group.

5. The UE of claim 1, wherein the one or more processors, when performing the action if the CR for the first beam group does not satisfy the CR limit associated with the first beam group, are configured to:
   reduce a transmission rate of transmissions using beams included in the first beam group.

6. The UE of claim 1, wherein the one or more processors are further configured to:
   receive, from a receiver device, a request to reduce a transmission rate of transmissions to the receiver device; and
   reduce the transmission rate of transmissions to the receiver device for transmissions by the UE that use one or more beams included in the first beam group based at least in part on receiving the request.

7. The UE of claim 6, wherein the one or more processors are further configured to:
   increase a transmission rate of transmissions to a second receiver device for transmissions by the UE that use one or more beams included in the first beam group based at least in part on reducing the transmission rate of transmissions to the receiver device.

8. The UE of claim 1, wherein the one or more processors are further configured to:
   receive, from a receiver device, an indication of a second CR limit associated with the receiver device;
   measure a second CR for the receiver device based at least in part on transmissions to the receiver device that use one of the plurality of beams included in the first beam group; and
   determine a transmission rate for transmissions to the receiver device based at least in part on the second CR and the second CR limit.

9. The UE of claim 1, wherein the one or more processors are further configured to:
   transmit, to a transmitter device, an indication of the CR limit for the first beam group; and
   receive, from the transmitter device, one or more signals at a transmission rate that is based at least in part on the CR limit.

10. A method of wireless communication performed by a user equipment (UE), comprising:

receiving, from a first transmitter device, a first signal using a beam of a plurality of beams included in a first beam group associated with the UE;

receiving, from a second transmitter device, a second signal using the beam or another beam included in the first beam group;

measuring, based at least in part on the first signal and the second signal, a channel occupancy ratio (CR) for the first beam group; and performing an action if the CR for the first beam group does not satisfy a CR limit associated with the first beam group,
wherein the action includes transmitting, to at least one of the first transmitter device or the second transmitter device, a request to reduce a transmission rate of transmissions that are to be received by the UE using beams included in the first beam group.

11. The method of claim 10, further comprising:
determining the CR limit associated with the first beam group based at least in part on at least one of:
a first channel busy ratio (CBR) associated with another UE that is communicating with the UE,
a second CBR for the first beam group, or
a second CR limit associated with the other UE.

12. The method of claim 10, further comprising:
measuring, using one or more beams included in the first beam group, a channel busy ratio (CBR) for the first beam group; and
determining the CR limit associated with the first beam group further based at least in part on the CBR for the first beam group.

13. The method of claim 10, wherein measuring the CR for the first beam group comprises:
measuring the CR based at least in part on a number of subchannels used for transmitting signals using beams included in the first beam group; or
measuring the CR based at least in part on a number of subchannels used for receiving signals using beams included in the first beam group.

14. The method of claim 10, wherein performing the action if the CR for the first beam group does not satisfy the CR limit associated with the first beam group comprises:
reducing a transmission rate of transmissions using beams included in the first beam group.

15. The method of claim 10, further comprising:
receiving, from a receiver device, a request to reduce a transmission rate of transmissions to the receiver device; and
reducing the transmission rate of transmissions to the receiver device for transmissions by the UE that use one or more beams included in the first beam group based at least in part on receiving the request.

16. The method of claim 15, further comprising:
increasing a transmission rate of transmissions to a second receiver device for transmissions by the UE that use one or more beams included in the first beam group based at least in part on reducing the transmission rate of transmissions to the receiver device.

17. The method of claim 10, further comprising:
receiving, from a receiver device, an indication of a second CR limit associated with the receiver device;
measuring a second CR for the receiver device based at least in part on transmissions to the receiver device that use a beam included in the first beam group; and
determining a transmission rate for transmissions to the receiver device based at least in part on the second CR and the second CR limit.

18. The method of claim 10, further comprising:
transmitting, to a transmitter device, an indication of the CR limit for the first beam group; and
receiving, from the transmitter device, one or more signals at a transmission rate that is based at least in part on the CR limit.

19. A non-transitory computer-readable medium storing a set of instructions for wireless communication, the set of instructions comprising:
one or more instructions that, when executed by one or more processors of a user equipment (UE), cause the UE to:
receive, from a first transmitter device, a first signal using a beam of a plurality of beams included in a first beam group associated with the UE;
receive, from a second transmitter device, a second signal using the beam or another beam included in the first beam group;
measure, based at least in part on the first signal and the second signal, a channel occupancy ratio (CR) for the first beam group; and
perform an action if the CR for the first beam group does not satisfy a CR limit associated with the first beam group,
wherein the action includes transmitting, to at least one of the first transmitter device or the second transmitter device, a request to reduce a transmission rate of transmissions that are to be received by the UE using beams included in the first beam group.

20. The non-transitory computer-readable medium of claim 19, wherein the CR limit associated with the first beam group is determined based at least in part on at least one of:
a first channel busy ratio (CBR) associated with another UE that is communicating with the UE
a second CBR for the first beam group, or
a second CR limit associated with the other UE.

21. The non-transitory computer-readable medium of claim 19, wherein the one or more instructions, that cause the UE to measure the CR for the first beam group, cause the UE to:
measure the CR based at least in part on a number of subchannels used for transmitting signals using beams included in the first beam group; or
measure the CR based at least in part on a number of subchannels used for receiving signals using beams included in the first beam group.

22. The non-transitory computer-readable medium of claim 19, wherein the one or more instructions, that cause the UE to perform the action if the CR for the first beam group does not satisfy the CR limit associated with the first beam group, cause the UE to:
reduce a transmission rate of transmissions using beams included in the first beam group.

23. The non-transitory computer-readable medium of claim 19, wherein the one or more instructions further cause the UE to:
receive, from a receiver device, a request to reduce a transmission rate of transmissions to the receiver device; and
reduce the transmission rate of transmissions to the receiver device for transmissions by the UE that use one or more beams included in the first beam group based at least in part on receiving the request.

24. The non-transitory computer-readable medium of claim 23, wherein the one or more instructions further cause the UE to:

increase a transmission rate of transmissions to a second receiver device for transmissions by the UE that use one or more beams included in the first beam group based at least in part on reducing the transmission rate of transmissions to the receiver device.

25. An apparatus for wireless communication, comprising:
   means for receiving, from a first transmitter device, a first signal using a beam of a plurality of beams included in a first beam group associated with the apparatus;
   means for receiving, from a second transmitter device, a second signal using the beam or another beam included in the first beam group;
   means for measuring, based at least in part on the first signal and the second signal, a channel occupancy ratio (CR) for the first beam group; and
   means for performing an action if the CR for the first beam group does not satisfy a CR limit associated with the first beam group,
      wherein the action includes transmitting, to at least one of the first transmitter device or the second transmitter device, a request to reduce a transmission rate of transmissions that are to be received by the apparatus using beams included in the first beam group.

26. The apparatus of claim 25, wherein the CR limit associated with the first beam group is determined based at least in part on at least one of:
   a first channel busy ratio (CBR) associated with a user equipment (UE) that is communicating with the apparatus,
   a second CBR for the first beam group, or
   a second CR limit associated with the UE.

27. The apparatus of claim 25, wherein the means for measuring the CR for the first beam group comprises:
   means for measuring the CR based at least in part on a number of subchannels used for transmitting signals using beams included in the first beam group; or
   means for measuring the CR based at least in part on a number of subchannels used for receiving signals using beams included in the first beam group.

28. The apparatus of claim 25, wherein the means for performing the action if the CR for the first beam group does not satisfy the CR limit associated with the first beam group comprises:
   means for reducing a transmission rate of transmissions using beams included in the first beam group.

29. The apparatus of claim 25, further comprising:
   means for receiving, from a receiver device, a request to reduce a transmission rate of transmissions to the receiver device; and
   means for reducing the transmission rate of transmissions to the receiver device for transmissions by the apparatus that use one or more beams included in the first beam group based at least in part on receiving the request.

30. The apparatus of claim 29, further comprising:
   means for increasing a transmission rate of transmissions to a second receiver device for transmissions by the apparatus that use one or more beams included in the first beam group based at least in part on reducing the transmission rate of transmissions to the receiver device.

* * * * *